United States Patent
Frick

(10) Patent No.: US 7,043,115 B2
(45) Date of Patent: May 9, 2006

(54) TUNABLE OPTICAL FILTER

(75) Inventor: Roger L. Frick, Hackensack, MN (US)

(73) Assignee: Rosemount, Inc., Eden Prairie, MN (US)

( * ) Notice: Subject to any disclaimer, the term of this patent is extended or adjusted under 35 U.S.C. 154(b) by 497 days.

(21) Appl. No.: 10/323,195

(22) Filed: Dec. 18, 2002

(65) Prior Publication Data

US 2004/0120638 A1 Jun. 24, 2004

(51) Int. Cl.
*G02B 6/26* (2006.01)

(52) U.S. Cl. .............................. 385/27; 385/14; 385/39; 333/219.1

(58) Field of Classification Search ................ 385/14, 385/15, 27, 39, 147; 333/219.1
See application file for complete search history.

(56) References Cited

U.S. PATENT DOCUMENTS

| | | | |
|---|---|---|---|
| 4,452,533 A | 6/1984 | Miles et al. | |
| 4,686,407 A | 8/1987 | Ceperley | |
| 4,758,087 A | 7/1988 | Hicks, Jr. | |
| 4,955,028 A | 9/1990 | Alferness et al. | |
| 5,097,476 A | 3/1992 | Thiessen | |
| 5,182,779 A | 1/1993 | D'Agostino et al. | |
| 5,187,546 A | 2/1993 | Johnston | |
| 5,319,435 A | 6/1994 | Melle et al. | |
| 5,331,658 A | 7/1994 | Shieh et al. | |
| 5,361,313 A | 11/1994 | O'Keefe | |
| 5,400,140 A | 3/1995 | Johnston | |
| 5,493,113 A | 2/1996 | Dunphy et al. | |
| 5,509,022 A | 4/1996 | Lowery et al. | |
| 5,513,913 A | 5/1996 | Ball et al. | |

(Continued)

FOREIGN PATENT DOCUMENTS

| | | |
|---|---|---|
| EP | 0 348 039 | 12/1989 |
| EP | 0 571 107 | 11/1993 |
| JP | 07063855 | 3/1995 |
| WO | WO 95/13638 | 5/1995 |

OTHER PUBLICATIONS

Heimala, et al., "Thermally Tunable Integrated Optical Ring Resonator with Poly–Si Thermistor," *Journal of Lightwave Technology* 14(10):2260–2267 (1996).

Shen et al., "Tunable Dielectric Resonators with Dielectric Tuning Disks in Cylindrical Enclosures," *Microwave Symposium Digest*, pp. 1441–1444 (2000).

Partial International Search Report from PCT/US03/38626 dated Jun. 7, 2004.

Arentoft, et al. Picco, D1:Report, pp. 1–26.

Berkoff, et al. "Experimental Demonstration of a Fiber Bragg Grating Accelerometer," *Photonics Tech. Letters* 8(12):1677–1679 (1996).

Big Payoffs in a Flash, *Scientific American* Sep. 2000 pp. 73–79.

Cai, et al. "Fiber–Optic Add–Drop Device Based on a Silica Microsphere–Whispering Gallery Mode System," *Photonics Technology Letters* 11(6):686–687 (1999).

(Continued)

*Primary Examiner*—Akm Enayet Ullah
*Assistant Examiner*—Kevin S. Wood
(74) *Attorney, Agent, or Firm*—Marshall, Gerstein & Borun LLP

(57) ABSTRACT

A tunable filter having a resonator with a resonant frequency dependent upon a variable gap is provided. The variable gap may be controllably altered by use of an actuator. The resonator is a high Q resonator that may be formed by a ring resonator, microsphere, microdisc, or other high Q optical structures. Actuation is preferably achieved through an electrostatic actuator that moves a dielectric plate relative to the resonator in response to measured values of gap and temperature.

27 Claims, 25 Drawing Sheets

U.S. PATENT DOCUMENTS

| | | | |
|---|---|---|---|
| 5,534,992 | A | 7/1996 | Takeshima et al. |
| 5,564,832 | A | 10/1996 | Ball et al. |
| 5,594,543 | A | 1/1997 | de Groot et al. |
| 5,637,865 | A | 6/1997 | Bullat et al. |
| 5,642,375 | A | 6/1997 | King et al. |
| 5,663,792 | A | 9/1997 | Killpatrick et al. |
| 5,808,743 | A | 9/1998 | Stephens et al. |
| 5,822,355 | A | 10/1998 | Ahn et al. |
| 5,825,799 | A | 10/1998 | Ho et al. |
| 5,974,060 | A | 10/1999 | Byren et al. |
| 6,034,770 | A | 3/2000 | Kim et al. |
| 6,323,746 | B1 * | 11/2001 | Prager et al. ............ 333/219.1 |
| 6,342,825 | B1 * | 1/2002 | Hershtig ..................... 333/202 |
| 6,362,708 | B1 * | 3/2002 | Woods ........................ 333/234 |
| 6,600,394 | B1 * | 7/2003 | Wang et al. ................ 333/235 |
| 6,473,218 | B1 | 6/2004 | Maleki et al. |
| 2001/0012149 | A1 | 8/2001 | Lin et al. |
| 2002/0044734 | A1 * | 4/2002 | Tapalian et al. .............. 385/24 |
| 2002/0154860 | A1 | 10/2002 | Fernald et al. |

OTHER PUBLICATIONS

Cai, et al. "Highly efficient optical power transfer to whispering–gallery modes by use of a symmetrical dual–coupling configuration," *Optics Letters* 25(4):260–262 (2000).

Dandliker, et al. "Electronically scanned white–light interferometry: a novel noise–resistant signal processing," *Optics Letters* 17(9):679–681 (1992).

De Brabander, et al. "Integrated Optical Ring Resonator With Micromechanical Diaphragm for Pressure Sensing," *Photonics Technology Letters* 6(5):671–673 (1994).

"Fiber Optic Sensors by Blue Road Research," *MEMS—Micromachines in Silicon—MEMS and MST from Standard MEMS*.

Fuhr, "Measuring with Light; Part 1" *Sensors* (2000).

Fuhr, "Measuring with Light; Part 2" *Sensors* (2000).

Fuhr, "Measuring with Light; Part 3" *Sensors* (2000).

"High–quality ring resonators," Zurich Research Laboratory.

International Search Report from PCT/US01/44399.

Jones, et al. "Near–diffraction–limited high power (~1W) single longitudinal mode CW diode laser tunable from 960 to 980nm," *Electronics Letters* 31(19):1668–1669 (1995).

Jones, et al. "Stabilization of the frequency, phase, and repetition rate of an ultra–short pulse train to a Fabry–Perot reference cavity," *Optics Communications* 175:409–418 (2000).

Katagiri, et al. "Dynamic microforce measurement by distortion detection with a coupled–cavity laser displacement sensor stabilized in a mechanical negative–feedback loop," *Applied Optics* 37(31):7193–7199 (1998).

Katagiri, et al. "Passively Mode–Locked Micromechanically–Tunable Semiconductor Lasers," *IEICE Trans. Electron.* E81(2):151–159 (1998).

Katagiri, "Small Displacement Sensor Measures Tiny Forces," *Sensor Technology* 16(6):7.

Kersey, et al. "Fiber Grating Sensors," *Journal of Lightwave Technology* 15(8):1442–1463 (1997).

Koo, et al. "Bragg Grating–Based Laser Sensors Systems with Interferometric Interrogation and Wavelength Division Multiplexing," *Journal of Lightwave Technology* 13(7):1243–1249 (1995).

Kurita, et al. "Ultrafast All–Optical Signal Processing with Mode–Locked Semiconductor Lasers," *IEICE Trans Electron* E81–C(2):129–139 (1998).

"Light–sensing technologies hurdle barriers," *NASA News* p. 28 (1997).

Meggitt, et al. "An all fibre white light interferometric strain measurement system," *Sensors and Actuators* 79:1–7 (2000).

Meggitt, et al. "Fiber optic white–light interferometric sensors," *Optical Fiber Sensor Tech.* pp. 269–312 (1995).

Notcutt, et al. "Allan Deviation Measurements of a Cryogenic All–Sapphire Fabry–Perot Reference Cavity," *1996 Conference on Precision Electromagnetic Measurements Digest*, pp. 193–194 (1996).

Rao, et al. "Recent progress in fibre optic low–coherence interferometry," *Meas. Sci. Technol.* 7:981–999 (1996).

"Resonant Structures and Devices Research," MIT Microphotonics Center.

Rogister, et al. "Experimental demonstration of suppression of low–frequency fluctuations and stabilization of an external–cavity laser diode," *Optics Letters* 25(11):808–810 (2000).

Schulz, et al. "Advanced fiber grating strain sensor systems for bridges, structures, and highways,".

Schulz, et al. "Health monitoring of an adhesive joint using a multi–axis fiber grating strain sensor system".

Sutter, et al. The Shortest KLM Ti:Sapphire Laser Pulse Started by a Semiconductor Saturable Absorber Mirror (SESAM), *IEICE Trans. Electron.* E81–C(2):123–124 (1998).

"Surface Gratings for Optical Coupling with Microspheres" NASA's Jet Propulsion Laboratory.

"Systems & Sensors," Bell College of Technology.

Tabib–Azar, et al. "Fiber–optics MEMS pressure sensors based on evanescent field interaction," *SPIE* 3276:135–146.

Tabib–Azar, et al. "MOEM Pressure and Other Physical Sensors Using Photon Tunneling and Optical Evanescent Fields with Exponential Sensitivities and Excellent Stabilities," *Conf. on Microelectronic Structures and MEMS for Optical Processing* 3513:210–222 (1998).

Talvitie, et al. "Improved frequency stability of an external cavity diode laser by eliminating temperature and pressure effects," *Applied Optics* 35(21):4166–4168 (1996).

Technology Transfer, OPLL sensor eases strain monitoring, NASA news, Jul. 2000, p. 30.

Udem, et al. "Accurate measurement of large optical frequency differences with a mode–locked laser," *Optics Letters* 24(13):881–883 (1999).

U.S. patent application Publication—US 2002/0154860; Published: Oct. 24, 2002.

Vasil'ev, et al. "A Diode Laser with and External High–Q Microcavity" LEOS Summer Topical Meeting, pp. 31–32 (1997).

Vassilovski, et al. "Carrier Transport Effects in Active and Passive Modelocking of Monolithic Quantum–Well Lasers at Millimeter–Wave Frequencies," *Photonics Tech. Letters* 8(12):1603–1605 (1996).

Weisbuch, et al., "Advances in Photonic Crystals," *Phys. Stat. Sol.* 221:93–99 (2000).

Weiss, "Spectrum deftly takes visible light's pulse," *Science News* 157(23):358–359 (2000).

Xinqi, et al. "A Narrow Line Width Tunable Diode Laser System," *Chinese Journal of Lasers*, B7(3):217–221 (1998).

International Search Report issued in PCT/US93/38626 application mailed on Oct. 20, 2004.

* cited by examiner

TUNABLE OPTICAL FILTER

FIELD OF THE INVENTION

The present disclosure relates generally to optical filters and more specifically to tunable optical filters.

BACKGROUND OF THE PRIOR ART

Optical communication systems like networking and telecommunications systems rely upon laser signals for information transmission. Whether via continuous wave or pulsed mode signaling, point-to-point data transfer is achieved through the creation, modulation, amplification, and transmission of laser signals. Data carrying laser signals pass through amplifiers, switches, filters, oscillators, and other optical components that make-up the optical communication system.

To be useful in transferring numerous data packets simultaneously, originating laser signals must have narrow bandwidth. Generally, any suitable laser source produces an output having a relatively narrow bandwidth, a bandwidth in part determined by the lasing medium gain profile and in part by the properties of the cavity within which the lasing medium is disposed. Even narrower bandwidths are desirable. In telecommunication applications, in particular, it is desirable to produce narrower bandwidth laser output signals and narrower bandwidth information carrying laser signals. Narrow bandwidth is important in wavelength division multiplexing (WDM) systems, for example, because each data stream in a WDM system is transmitted at a slightly different wavelength, the data stream bandwidths must be sufficiently narrow to avoid signal contamination. In other words, the bandwidths of adjacent laser signals must be narrow enough so that the laser signals do not overlap spectrally. The ability to set the frequency of a signal with high tolerance is desired in modem-telecommunications applications. It is also desirable to change the operating frequency of a laser to optimize the communication network.

Optical filters are a means of tuning and narrowing the bandwidth of an optical signal. Optical filters may serve many functions in an optical network. For example, they may perform signal processing functions, such as noise filtration and demultiplexing/multiplexing, i.e., where a multi-channel optical signal is separated/combined into its constituent elements. In principle, multiplexers, Mach-Zehnder interferometers, and the like may all be considered as performing optical filter functions.

Optical filters are also used more generally as a means to narrow the bandwidth of an existing laser signal, or energy. For example, high Q value resonators, typically formed of a highly reflective optical cavity have been used to externally tune the frequency of a laser output energy. Such external resonators rely upon the fact that it is possible to stabilize the frequency of a laser by raising the Q of the mechanism that determines the lasing frequency. In effect, a highly tuned filtering action is achieved that allows only a single frequency to be amplified. This can be achieved by either raising the Q of the lasing cavity itself or by coupling a laser with a low Q cavity to an external cavity with a high Q. A few low-noise lasers have been shown in which a high Q micro-cavity, such as a quartz microsphere, emits a stabilized laser signal. While these devices have been used to narrow bandwidths, they have not been used to controllably adjust the peak frequency of a laser output energy.

Some have attempted to adjust the frequency of a laser output energy, but the solutions have proved unsatisfactory. A device for modulating laser frequency has been shown having a portion of the laser emission reflected back into the laser from a moving target. The semiconductor diode lasers used, however, exhibit very large frequency noise components and, therefore, the base laser frequency varies randomly over a large bandwidth. Further, the external cavity used has a low Q due to limited reflectance from the target. So while the peak frequency of the output signal may be changed, the bandwidth profile suffers due to the modulating mechanism. Still others have proposed using Fabry-Perot structures to determine the frequency of a laser output, or optical sensor output, though the solutions here have not resulted in the ability to finely tune the output frequency while maintaining a narrow bandwidth spectral profile of the output across the range of output frequencies.

As the foregoing indicates, known optical filters have been used with laser sources or laser signal propagation media to set the frequency of and narrow the spectral bandwidth of an propagating energy, but the art has not provided a structure or method for producing a continuously tunable output frequency laser that is also characterized by narrow bandwidths such as though desirable in telecommunication networks, like WDM systems. It is therefore desirable to have a structure that controllably sets the output frequency, where such output energy has a narrow bandwidth, thereby allowing the output frequency to be set with finer precision. In addition there is a need for an adjustable filter with narrow bandwidth, high stability and wide tuning range for demultiplexing optical communication frequencies such as those used for WDM systems.

SUMMARY OF THE INVENTION

In accordance with an embodiment, provided is an optical filter apparatus comprising a dielectric resonator coupled to receive input energy from the source, the dielectric resonator producing an output energy at a resonant frequency of the filter; and a dielectric plate mounted adjacent the dielectric resonator and on a support for controllably moving the dielectric plate relative to the dielectric resonator, the dielectric plate and the dielectric resonator defining a variable gap, external to the dielectric resonator, that varies during the controlled movement to alter the resonant frequency of the dielectric resonator.

In accordance with another embodiment, provided is a an optical filter apparatus comprising: a dielectric resonator coupled to receive input energy from the laser source and producing an output energy at a resonant frequency of the optical filter, the dielectric resonator having a cavity defining an internal variable gap, and the optical sensor having a sensing surface responsive to a force to vary the internal variable gap, where variations to the internal variable gap change the resonant frequency; a first conductive plate disposed on the sensing surface; and a second conductive plate rigidly mounted above the first conductive plate opposite the sensing surface for interacting with the first conductive plate to apply a force to the sensing surface to thereby alter the resonant frequency.

In accordance with another embodiment, provided is an optical filter apparatus comprising: a first waveguide receiving an input energy from the laser source; a dielectric resonator coupled to receive the input energy and produce an output energy at a resonant frequency of the optical filter, the dielectric resonator having a second waveguide orthogonal to the first waveguide and coupled to the first waveguide over a coupling region; a dielectric plate mounted adjacent the dielectric resonator; and an actuator controllably moving the dielectric plate relative to the dielectric resonator, the dielectric plate and the dielectric resonator defining a variable gap, external to the resonator, that varies during the controlled movement to alter the resonant frequency of the dielectric resonator.

In accordance with another embodiment, provided is a method of filtering a laser energy, comprising: providing a dielectric resonator having a resonant frequency; coupling the laser energy into the dielectric resonator; providing a dielectric plate moveable relative to the dielectric resonator, the dielectric plate and the dielectric resonator defining a variable gap; controllably varying the variable gap, where variations to the variable gap alter the resonant frequency; and coupling an output energy from the dielectric resonator, the output energy having a frequency at the resonant frequency.

In accordance with another embodiment, provided is a method of filtering a laser energy, comprising: providing a dielectric resonator coupled to receive the laser energy and to produce an output energy at a resonant frequency of the optical filter, the dielectric resonator having a cavity defining an internal variable gap, and the optical sensor having a sensing surface responsive to a force to vary the internal variable gap, where variations to the internal variable gap change the resonant frequency; applying the force to the sensing surface in a controlled manner to selectively change the resonant frequency of the dielectric resonator; providing a first conductive plate disposed at the sensing surface; providing a second conductive plate mounted adjacent the first conductive plate; and forming a charge differential between the first conductive plate and the second conductive plate, such that the first conductive plate will apply the force to the sensing surface and thereby alter the resonant frequency.

DETAILED DESCRIPTION OF A PREFERRED EMBODIMENT

Below are described various apparatuses and methods that may be used to form an optical sensor. Generally, some embodiments provide lasers, preferably operating in a pulsed output mode, that produce a laser signal of a repetition rate or frequency that is modulated by a measurable parameter. By using a mode locked laser, conventional high-speed electronics can be used to measure the modulated laser signal, and the repetition rate or frequency of the laser signal can be measured with high resolution. By measuring the frequency of the laser signal, a value for the measurable parameter can be derived.

In some embodiments, a high Q optical resonator produces the laser signal with a frequency dependant upon the measurable parameter. The high Q resonator can be internal or external to the laser. The devices have lower power consumption and improved accuracy over the state of the art. The devices may be used to measure changes in a measurable parameter or they may be used to make absolute measurements. Further applications and further embodiments will be apparent to persons of ordinary skill in the art. For example, the devices described may be adapted for use as tunable optical filters, tunable laser sources, and other all optical applications.

Many of the structures described below are described in exemplary applications, such as to measure a change in a measurable parameter by measuring the change in frequency or repetition rate of a laser signal in response to changes to the resonance properties of a high Q resonator. The structures described may be used in numerous other embodiments, as well, including as tunable filters in which the resonance properties of the high Q resonators are controlled by separate actuation mechanisms. Here the resonance properties of the high Q resonators are not responsive to changes in the measurable parameter, as with other structures, unless the values of such measurable parameters themselves are controlled. Preferably, an actuation mechanism is used to controllably tune the frequency of a laser signal. Various examples are described below.

Figure 1:
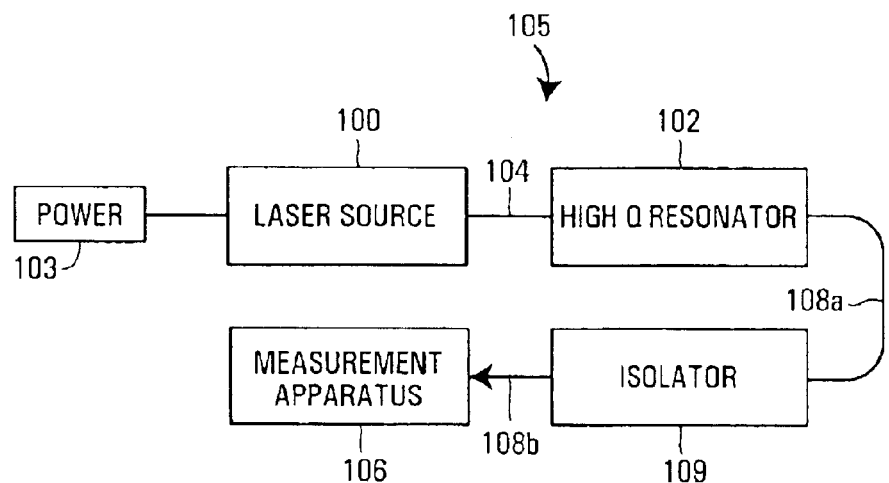
FIG. 1 is a block illustration of an external high Q resonator coupled to a laser in accordance with an embodiment.
Figure 2:
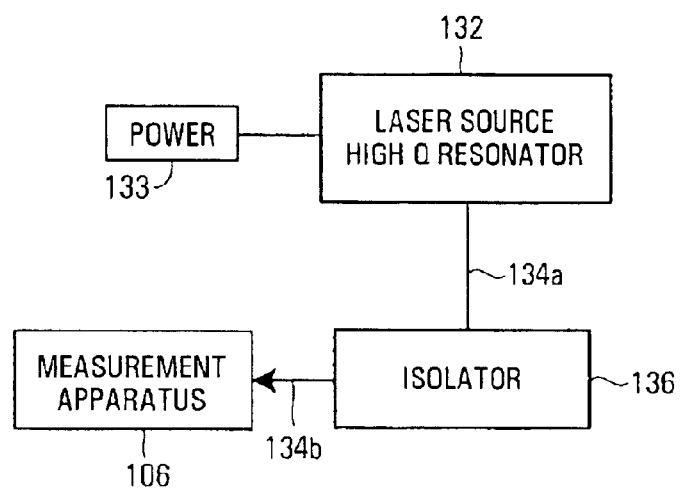
FIG. 2 is a block illustration of a laser with an internal resonator according to an embodiment.

FIGS. 1 and 2 show exemplary embodiments. FIG. 1 shows a laser 100 coupled to an external high Q resonator 102 through a coupler 104, generally shown. The laser 100 may be a fiber-doped laser, a ruby laser, or a diode laser, though other laser sources are contemplated. The laser source 100 may also be replaced with a light emitting diode (LED). In another alternative, the laser 100 may be an amplification stage, like an optical parametric amplifier or fiber amplifier stage pumped by a laser source. In the depicted example, the laser source 100 receives power from a power source 103, which as it would be understood by persons of ordinary skill in the art may take the form of an optical or electrical power source. The laser energy is preferably at a wavelength in the visible or infrared region, though the laser energy may be within the far-infrared and microwave regions as well.

In the preferred embodiment, the coupler 104 is an optical fiber or optical waveguide, and coupling is achieved through low-loss evanescent coupling. Coupling may be achieved through partially transmissive mirrors, waveguide taps, or other known means for coupling optical signals.

The laser source 100 provides a laser energy to the high Q resonator 102 through the coupler 104. The laser energy coupled from the laser 100 to the resonator 102 is at a wavelength corresponding to the resonance of the laser cavity within the laser 100. Such laser cavities, however, have low Q and produce an output of relatively large bandwidth. The Q of the external resonator 102 is preferably substantially higher than the Q of the laser cavity within the laser 100. For example, in the preferred embodiment, the Q of the resonator 102 would be at least 100. Typical resonators only have Q values between 3 and 100 and are limited by the mirrors forming the resonant cavity and the desired power output.

It is generally known that a low Q oscillator system will lock onto the frequency of a high Q resonator if there is sufficient coupling between the oscillator and the resonator and if the frequency ranges of the two regions overlap. The low Q laser cavity of laser 100 locks onto the resonance frequency of a high Q resonator 102. That is, the exchange of energy between the high Q resonator 102 and the lower Q laser 100 will lock the laser signal of the entire system to a frequency and bandwidth defined by the resonator 102. The result is that the system produces a laser signal of a narrow bandwidth and centered at a resonance frequency of the resonator 102.

The laser source 100 may be a continuous wave (CW) source or a preferably a pulse mode locked laser source. If the source 100 is a CW source, then the laser signal from the system locks onto the resonant frequency of the resonator 102 and has a narrowed bandwidth induced by the high Q of the resonator 102. Here, a spectrometer would be used to measure the frequency of the laser signal. If the source 100 is a pulse mode locked laser source, the resonator 102 additionally determines the repetition rate of the pulse train. Here, conventional electronic detectors can be used to measure the sub 100 GHZ repetition rate.

Optical resonators have multiple resonant frequencies. It is desirable, however, that only a single resonant frequency be located within the bandwidth of the laser energy supplied by the laser sources. That is, the laser signal exists at a single consistent resonant frequency. This condition will reduce the mode hoping that occurs in some state of the art laser systems. A distributed feedback laser (DFB) laser may be used as the laser source 100 to achieve a bandwidth that allows a single resonant frequency. The physical parameters of the resonator 102 could be altered to achieve single resonance, as well.

The resonator 102 is formed of an optically transparent material. The material may be a lasing material or a non-lasing material. Suitable materials include sapphire, quartz, doped quartz, polysilicon, and silicon. These materials exhibit low optical losses. These materials also exhibit good mechanical properties that respond precisely and consistently to changes in the measurable parameters and do not permanently deform under pressure or force, but instead return to their original shapes after the measurable parameter has returned to a steady stated value. Preferably, materials that allow propagation under total internal reflection are used. The total internal reflection and low optical losses allow for very high Q resonators.

The resonator 102 is characterized by having resonant frequencies that depend upon measurable parameters near the resonator 102. Herein, "measurable parameters" means those parameters associated with an external force or pressure. Pressure (absolute and differential), temperature, flow rate, material composition, force, and strain are examples. Laser source 100 and high Q resonator 102 collectively form an optical sensor 105, which produces a laser signal or sensed signal, dependent upon a measurable parameter.

The laser signal is supplied to a measuring apparatus 106 through structure generally shown as couplers 108a and 108b and isolator 109. If the laser source 100 is a pulse mode locked laser, the measuring apparatus 106 could be a conventional high-speed electronics detector. If the laser source 100 is a continuous wave source, the measuring apparatus 106 is preferably a spectrometer or other suitable device for measuring signal frequency.

The isolator 109 prevents back reflected signals of the measuring apparatus 106 from entering into the resonator 102. As the laser signal is dependent upon a measurable parameter, the measuring apparatus 106 may additionally derive a value for the measurable parameter by measuring the frequency or repetition rate of the laser signal and calculating a measurable parameter value corresponding to that measurement. This derivation is performed in known ways. The coupling between the resonator 102 and the measuring apparatus 106 may be achieved through fiber coupling, mirror coupling, taps, evanescent coupling or other suitable coupling types.

The resonator 102 has a high Q value and, therefore, the energy coupled between the laser 100 and the resonator 102 may be very low and proper locking onto a resonant frequency of the resonator 102 will occur. Another advantage of using the high Q external resonator 102 is that the signal/noise (S/N) ratio of the system improves. Generally, the S/N ratio and resolution of a frequency modulated laser system is limited by the frequency jitter in the lasing mechanism. This jitter has many sources; mode hoping, power supply noise, thermal noise, quantum fluctuations and gain noise in the lasing media are a few. Amplitude noise fluctuations modulate the lasing frequency itself so that the resulting frequency noise cannot be filtered out once it has been generated.

By way of example, the S/N ratio is proportional to the GF, defined above, under the following proportionality: $S/N = GF \cdot f_r/f_n$. The value $f_n$ is the noise frequency dither inherent in $f_r$. A high GF results in a high S/N ratio. Coupling a laser output into an external high Q resonator, like resonator 102, means that laser output frequency will be determined by the resonator and, therefore $f_n$ will be low and the S/N ratio characteristics will be determined primarily by the characteristics in the external resonator. The resonators shown herein are also characterized by high GF and therefore high S/N ratio.

The external resonator structure of FIG. 1 is useful to make measurements in environments hostile to laser operation, because the sensing mechanism (i.e., the resonator 102) is remote to the laser source 100. Also, in this embodiment, the external resonator 102 is not susceptible to the high temperatures produced by the laser source 100.

FIG. 2 is block depiction of an alternative embodiment of an optical sensor 130, in which a laser 132 is formed of an internal high Q resonator. Here, the high Q resonator forms the laser 132 and, therefore, functions as the laser gain cavity. The high Q resonator is formed of a material that lazes upon being pumped by an appropriate feed energy. By way of example only, the laser source 132 is shown receiving power from a power source 133, which as it would be understood by persons of ordinary skill in the art may take the form of an optical or electrical power source. Semiconductor materials, doped sapphire, doped quartz, and other materials may also be used to form the internal resonator. Doped quartz is particularly beneficial because when quartz is doped with the rare earth element erbium the quartz can be made to emit laser light of 1550 nm, i.e., the preferred low-loss wavelength for current optical fiber communications. The laser signal is produced by the laser 132 and provided to the measuring apparatus 106 through couplers 134a and 134b and an isolator 136, similar to that described above.

Provided in a preferred embodiment is a frequency modulated laser source that produces a pulse train as the laser signal. The repetition rate of the pulses varies as a function of a measurable parameter acting on a resonator, and, therefore, the entire structure forms a high resolution and high accuracy optical sensor. For example, simply counting of a 1 GHz change (induced by a change in a measurable parameter) in a 100 GHz signal would give a resolution of 1 ppb over a 1 second measurement. State of the art lasers have noise bandwidths of a few KHz with a base frequency of about 200,000 GHz, indicating that a resolution of more than 30 bits is attainable with such an optical sensor.

There are various ways known in the art to set-up a mode-locked laser such as using either passive mode-locking or active mode-locking. Ti:Sapphire mode-locked lasers pumped with an Argon continuous wave laser source or pumped with a Nd:Yag laser continuous wave source have been shown. Others have shown passive modelocking using semiconductor lasers and micro-mechanical tuning. Any mode-locked laser would be suitable as the laser source 100 of FIG. 1 and various mode-lock laser set-ups may be used in the embodiment of FIG. 2. Thus, pulse mode locked operation is contemplated in both the external and internal resonator embodiments.

Figure 3A:
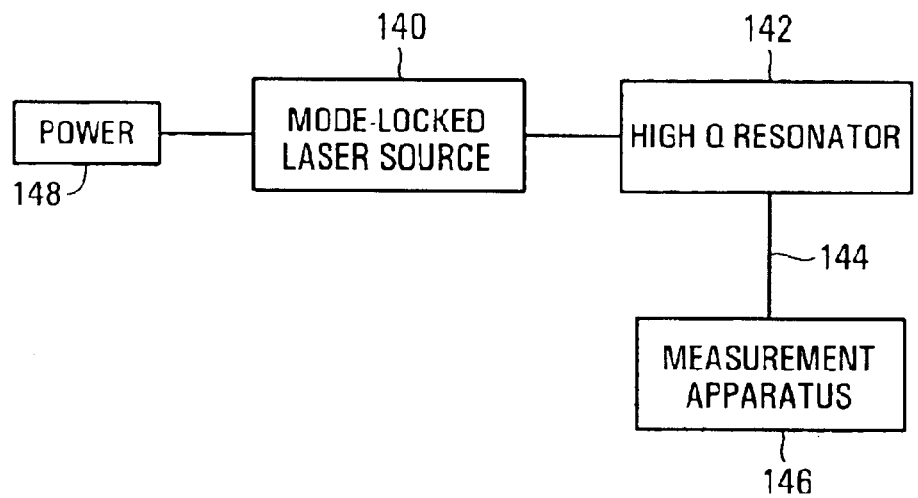
FIG. 3A is a block illustration of a mode-locked laser having an optical gain medium in accordance with an embodiment.

An exemplary mode-locked laser is shown in FIG. 3A, showing a laser 140 coupled to an external high Q resonator 142 for producing a mode-locked laser signal 144 at an operating frequency related to a measurable parameter acting on the resonator 142. The laser 140 includes a mode-locking mechanism, which can take a variety of forms as known in the art. For instance, a saturable amplifier can be introduced into the lasing cavity such that only short pulses are able to pass without attenuation. The laser signal 144 is a pulsed laser signal having a repetition rate dependent upon the measurable parameter acting on a sensing (e.g., outer) surface of the high Q resonator 142. In particular, pulsed laser signals 144 of the laser 140 locked to the external high Q resonator 142 have a repetition rate determined by $F = F_{in}(1-h/nL)$ where h is the round trip length of the external resonator, L is the round trip length of the mode locked laser, n is the effective refractive index, and $F_{in}$ is the round trip frequency of the mode locked laser. (See "Passively Mode-Locked Micromechanically-Tunable Semiconductor Lasers", Katagirie et al., IEICE Trans. Electron., Vol. E81-C. No. 2, February 1998). A measuring apparatus 146 measures this repetition rate and uses that measurement to derive a value for the measurable parameter. The laser 140 is exemplarily shown being pumped by a power source 148, which represents any of the known sources of pump energy for a mode-locked laser.

Figure 3B:
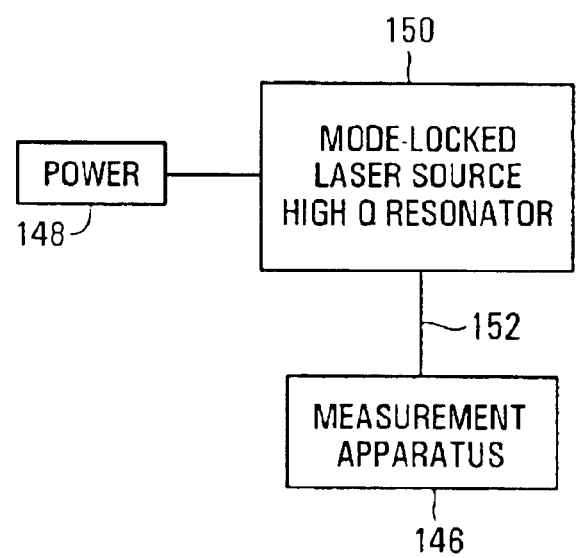
FIG. 3B is a block illustration of a mode-locked laser having an optical gain medium in accordance with an embodiment.

Referring to FIG. 3B, a mode locked laser 150 may alternatively incorporate the high Q resonator internal to the lasing cavity (similar to FIG. 2) to produce the mode locked laser signal 152. With this internal resonator structure, the repetition rate of the laser signal 152 is simply the round trip time of the resonator. As noted above, the mode locking mechanism of the laser 150 can be accomplished through a variety of techniques known in the art such as introducing a saturable amplifier section into the loop or using active mode locking. The measuring apparatus 146 then measures the repetition rate of the laser signal 152 to derive a value for the measurable parameter acting on a sensing surface of the laser/resonator. Though not shown, the embodiments of FIGS. 3A and 3B may be implemented with isolators and other optical components (such as varied optical couplers) as desired.

Some exemplary resonator structures characterized by a resonant frequency dependent upon a measurable parameter will now be discussed.

Figure 4:
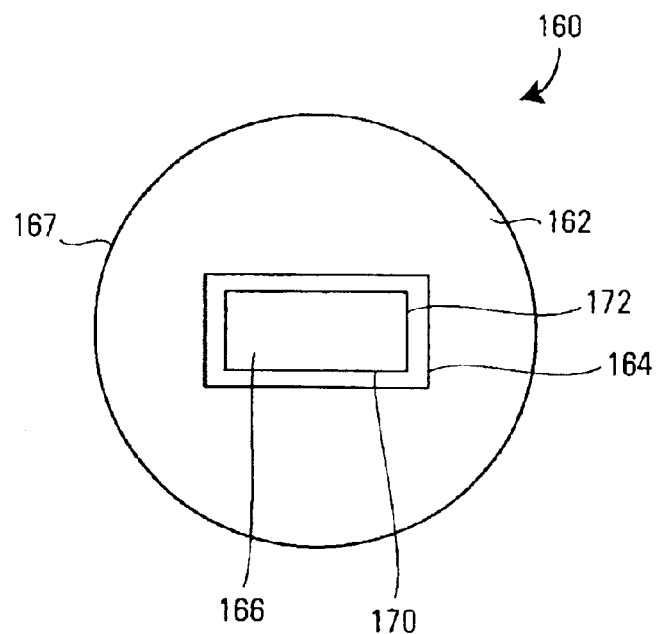
FIG. 4 is a cross-sectional view of an optical fiber in accordance with an embodiment.
Figure 5:
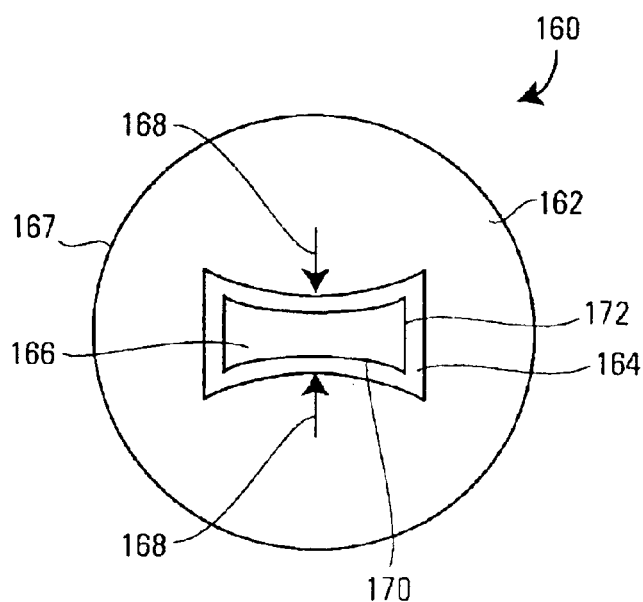
FIG. 5 is a cross-sectional view of the optical fiber of FIG. 1 after a measurable parameter has changed at a sensing surface of the fiber.

FIGS. 4 and 5 depict a cross section of an optical fiber 160 that may be used to form the resonator 102 or 132. The optical fiber 160 may be formed of any of the standard materials used in optical fibers and is preferably a single mode fiber. The optical fiber 160 is characterized by a cladding region 162 and a higher index of refraction core region 164. This configuration confines propagation primarily to the core 164 and a signal propagating within the core 164 propagates under total internal reflection.

Figure 9:
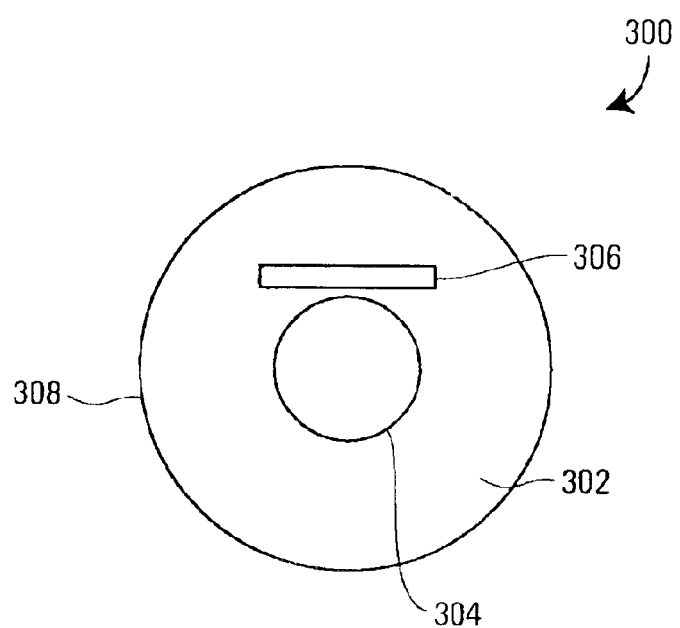
FIG. 9 is a cross-sectional profile of an optical fiber in accordance with an embodiment alternative to that of FIGS. 4 and 5.

The optical fiber 160 contains a cavity 166 defining a variable gap, which may be evacuated or contain a gas or other suitable material. The cavity 166 is formed in the fiber 160 through known processing methods, such as etching or drawing down a blank or preform that includes the cavity. In FIG. 4, the cavity 166 is entirely disposed within the core 164. The cavity 166 may also be partially within the core 164 or entirely external to the core 164, as shown in the embodiment of FIG. 9. In the preferred embodiment, the cavity 166 is similarly shaped in cross-section to that of the core 164. Also, in a preferred embodiment the cavity 166 would be symmetric to the core 164. While both the cavity 166 and the core 164 are shown with a rectilinear cross-section, it would be understood that other cross-sectional profiles may be used. For example, other shapes for the cavity could be used such as a multiplicity of closely spaced round holes which change size in response to a sensed variable or measurable parameter. The cavity 166 extends longitudinally with the core 164 along at least a portion of the fiber 160.

The gap of the cavity 166 varies in response to changes in measurable parameters, for example, changes in pressure or force external to the fiber 160. In operation, an increase in the pressure on the outside of the fiber 160 applies force to an outer wall or sensing surface 167 of the fiber 160, which results in radial forces being applied through the cladding region 162 and on the cavity 166. Due to the geometry of the cavity 166, some of the radial forces will not alter the cavity shape. Other forces, principally forces represented by arrows 168 (see, FIG. 2), will act to compress the cavity 166. Therefore, an increase in pressure at the sensing surface 167 of the fiber 160 will result in the compression, i.e., inward displacement, of the cavity 166. Though, not shown it would be understood that a decrease in pressure would result in an expansion of the cavity 166.

Changes in the other measurable parameters would alter the cavity 166, as well. For example, the fiber 160 may be placed within a processing flow system such that changes in flow rate, temperature, or material composition alter the geometry of the cavity 166. Changes in any of the measurable parameters would result in changes in the variable gap of the cavity 166. The cavity 166, therefore, provides an alterable perturbation within the propagating core 164, a perturbation that alters in response to a measurable parameter.

It is preferred that the cavity 166 have a cross-sectional shape that can be compressed and decompressed in response to relatively small changes in the measurable parameter. It is also preferred that the cavity displacements be relatively small, i.e., in the micron and sub-micron range so that the propagation characteristics within the core 164 change a detectable amount, but not an amount that will detrimentally affect the mode profile of a wave propagating within the core 164. In the examples of FIGS. 4 and 5, an elongated rectangular profile is used for the cavity 166. The cavity 166 has a first side 170 longer than a second side 172. The cavity 166 has dimensions on the order of the wavelength(s) to propagate within the fiber 160. The steady state cavity profile (e.g., at atmospheric pressure) can be changed depending on the desired sensitivity and the parameter to be measured.

Changes to the shape of the cavity 166 will alter the propagation characteristics within the core 164. In particular, a wave traveling within the core 164 experiences a particular index of refraction within the core 164. A fiber core is typically characterized by a material dependent index of refraction. A wave propagating within the core 164 experiences an effective index of refraction that is dependent upon the various materials that the wave propagates through. A propagating wave has an electric field that passes primarily through the core 164 and cavity 166 but also extends substantially into the cladding 162. The energy stored in the electric field is thus dependent on the refractive indices and geometries of the three regions, and the energy stored in the electric field determines the velocity of propagation of the electromagnetic wave along the length of the fiber 160. The propagating wave thus behaves as though it is traveling through a uniform material with an effective index of refraction that is a geometry weighted average of the index of refraction of the three regions. The effective index of refraction experienced by a propagating wave changes with changes to the geometry, i.e., compression or expansion of the cavity 166. Described now are some exemplary applications in which the change to the effective index of refraction of a wave propagating in a core can be used in an optical sensor.

Figure 6:
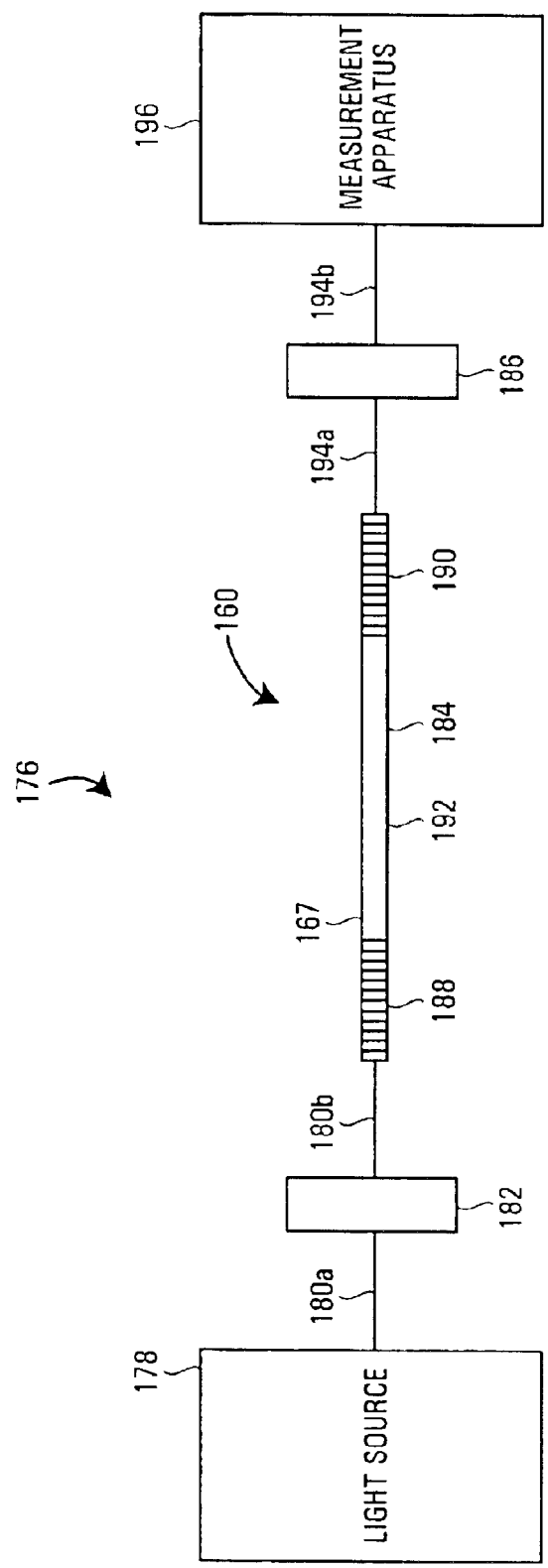
FIG. 6 is an illustration of the optical fiber of FIG. 4 used in an optical sensor in accordance with an embodiment.

FIG. 6 shows the fiber 160 of FIGS. 4 and 5 in a optical sensor 176. The structure may also be considered an apparatus of modulating laser signal frequency. The depicted configuration is similar to that of the laser system of FIG. 1. The optical sensor 176 has a light source 178 supplying an output to the fiber 160 through an isolator 182 and couplers 180a and 180b. Preferably, a semiconductor laser or LED source is used as the light source 178. The source 178 could be a continuous-wave laser or a pulse mode locked laser, though in the latter case the optical medium forming the fiber 160 is not a lasing medium. The fiber 160 is doped to form a lasing material, and the output from the source 178 is a pump energy of a wavelength sufficient to allow lasing action in the fiber 160.

The fiber 160 has a middle portion 184 over which changes to a measurable parameter are measured. A first end of the fiber 160 has a first reflector in the form of Bragg reflector 188 and a second end has a second reflector in the form of Bragg reflector 190. The middle portion 184 extends between the Bragg reflectors 188 and 190 and coincides with the sensing surface 167. The Bragg reflectors 188 and 190 define a resonator 192 within the optical fiber 160. In the depicted environment, the resonator 192 extends along the length of the optical fiber coinciding with the middle portion 184 and extending slightly into the Bragg reflectors 188, 190. In the preferred embodiment, the cavity 166 (not shown) does not extend into the Bragg reflectors 188, 190. However, the cavity 166 may extend into the Bragg reflectors 188, 190 if desired. Though shown as Bragg reflectors 188 and 190, the first and second reflectors could alternatively be mirrors or other highly reflective structures formed on the fiber 160 or external thereto.

In operation, the pump energy produced by light source 178 is supplied to the resonator 192 through the partially transmitting Bragg reflector 188. A laser signal emits from the Bragg reflector 190 along couplers 194a and 194b and through isolator 186. The laser signal has a wavelength corresponding to a resonance frequency of the resonator 192. The frequency of the signal on coupler 194b is measured by a measuring apparatus 196.

Upon a change to a measurable parameter at the sensing surface 167, specifically over the middle portion 184, the cavity 166 will be altered and thereby alter the effective index of refraction experienced by a signal propagating within the core 164. The effective index of refraction will determine the velocity of propagation of the light wave in the resonator 192. This in turn will determine the resonant frequency of the resonator 192 and, therefore, the frequency of the laser signal on coupler 194a in CW operation. In mode-locked operation, the repetition rate is altered. Changes to a measurable parameter will be detected by the detector 196 in the form of changes in the frequency of the laser signal.

In CW operation of the sensor 176, the measurement apparatus 196 is a detector in which the laser signal frequency is compared to the frequency of a reference laser to allow for the measurement of very fine changes to the frequency of the laser signal. In pulse mode operation, the measurement apparatus 196 is an electronic detector that measures changes in the repetition rate of the laser signal pulse train. In either case, cavity displacements of a micron or below will result in frequency changes that can be measured by the detector 196. Though not shown, a CPU or other processor is used to compute a value for the measurable parameter based on the detected laser signal frequency. Changes in measurable parameters are detectable as well as absolute measurements. It would be understood that an initial normalization may be used to calibrate the detector 196 and/or processor for accurate measurements of the measurable parameter. For example, a normalization may be performed before a different measurable parameter is to be sensed. It would be further appreciated that multiple sensors can be used with a processor to make varying sorts of other measurements, like measuring ΔP between two separate locations within a flow system. With a typical gage factor of 0.01 to 0.1 and a Q of 160 or more measurements with 0.01% to 0.001% resolution may be made with the sensor 176.

Figure 7:
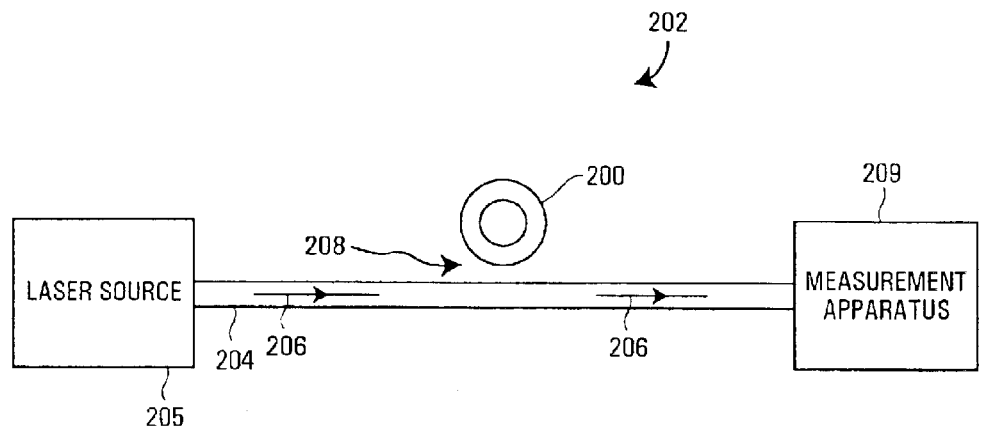
FIG. 7 is an illustration of a ring resonator in accordance with an embodiment.

Alternative resonators are contemplated. An example of an alternative resonator is shown in FIG. 7. Here, a waveguide 200 forms a circular resonator also known as a ring resonator and will be termed as such henceforth. The ring resonator 200 may be formed by joining ends of a optical fiber using commercially available fusing techniques in the preferred embodiment. The ring resonator 200 has a cladding, core region, and cavity like those of the optical fiber 160 when viewed in cross-section. The ring resonator 200 is characterized by high Q and high gage factor and forms part of an optical sensor 202. If the cavity extends the entire length of the ring resonator 200, then the entire outer surface of the ring resonator 200 would act as a sensing surface.

Coupling of a signal into the closed loop of the ring resonator 200 is achieved through evanescent coupling. A primary waveguide 204 is brought within evanescent coupling contact of the ring resonator 200 over a region generally shown by reference numeral 208. The waveguide 204 is an optically transparent waveguide formed, for example, of a polysilicon material. Sapphire and quartz would also be useful for creating total internal reflection propagation and the waveguide could be another optical fiber. A laser signal 206 from laser source 205 is made to propagate through the waveguide 204.

The signal 206 locks onto the resonant frequency within the resonator 200 and has a narrow bandwidth induced by the coupling into the resonator 200. The signal 206 therefore is dependent upon the properties with the resonator 200, i.e., it is dependent upon a measurable parameter at an outer surface of the resonator 200. Signal 206 is provided to a measurement apparatus 209, such as those described above. It is noted that in one embodiment the ring resonator 200 may be formed from a lasing material such that the resonator constitutes the laser cavity such as shown in the internal resonator embodiment of FIG. 2.

Figure 8:
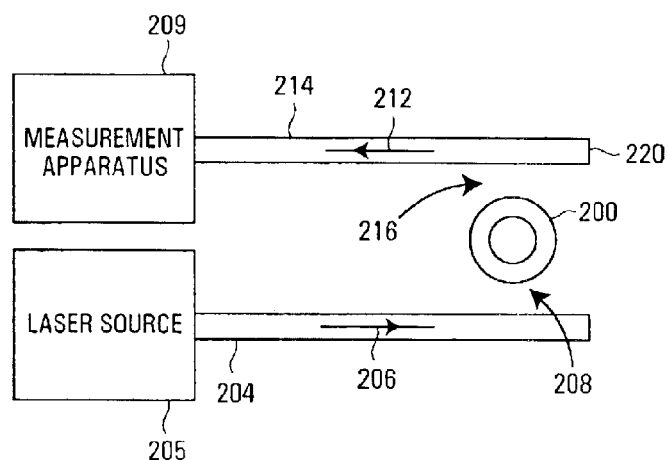
FIG. 8 is an illustration of a ring resonator in accordance with another embodiment.

An alternative embodiment is shown in FIG. 8, in which a signal 210 propagating with the resonator 200 is coupled as signal 212 to a secondary or output waveguide 214 that is within coupling contact with the ring resonator 200 over a region generally shown as 216. This embodiment is particularly useful where the resonator 200 is formed of a non-lasing material. The output waveguide 214 is outside of coupling contact with the waveguide 204. Waveguide 214 is placed in proximity to the ring resonator 200 such that signal 212 is evanescently coupled into waveguide 214 without significantly affecting the resonant frequency of resonator 200. The signal 212 is coupled to the measuring device 209. The ring resonator 200 and waveguides 214 and 204 are preferably created during the same overall process to reduce device cost and fabrication times.

The embodiment of FIG. 8 may be particularly useful in filtering out a wavelength from an incoming signal. For example, with signal 206 as a broad bandwidth LED energy or a white light energy, the resonator 200 would remove that part of the propagating energy coinciding with the resonance frequency and bandwidth of the resonator 200. The signal 212 would be at the removed frequency. With resonator 200, near complete removal of the resonant frequency from the signal 206 is achievable.

FIG. 9 shows a suitable alternative embodiment to FIGS. 4 and 5 of a fiber 300 having a cladding region 302, a core 304 and a cavity 306. The outer surface 308 is the sensing surface of the fiber 300. The cavity 306 defines a variable gap similar to that of the cavity 166 in that the cross sectional profile of the gap changes in response to changes in measurable parameters. Here, however, the cavity 306 is disposed entirely within the cladding region 302. The cavity 306 is nonetheless close enough to the core 304 to change the effective index experienced by a signal propagating therein. As with the above embodiments, changes to the cavity 306 induced by changes in measurable parameters would alter the effective index. Thus, the fiber 300 can be used in a resonator or laser cavity to produce an output signal that is dependent upon measurable parameters. The fiber 300 is suitable for use in the Bragg reflector resonator or the ring resonator configurations described above, as well as other resonator configurations. As with the fiber 100, the core 304 would be formed of higher index optically transparent material, preferably transparent in the infrared region. The core 304 and the cavity 306 can have different cross sectional profiles and still achieve the desired dependency of the resonant frequency upon changes in the measurable parameters.

Figure 10:
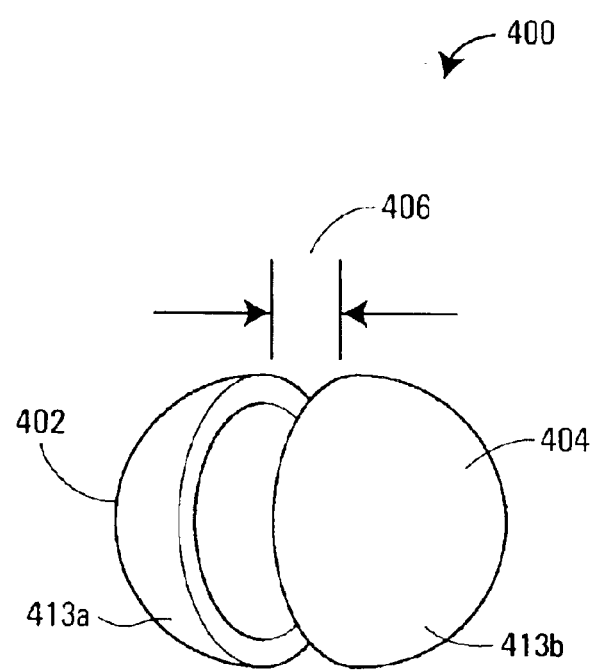
FIG. 10 is an illustration of a microsphere resonator in accordance with an alternative embodiment.
Figure 11:
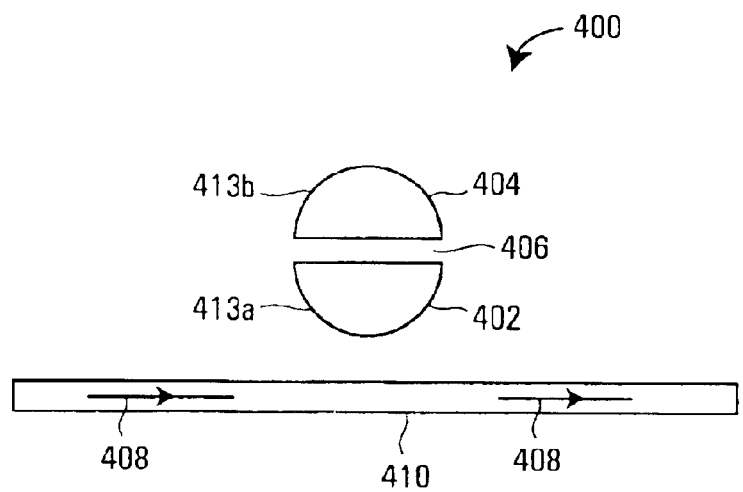
FIG. 11 is an illustration of the microsphere resonator of FIG. 10 in an exemplary optical sensor.
Figure 12:
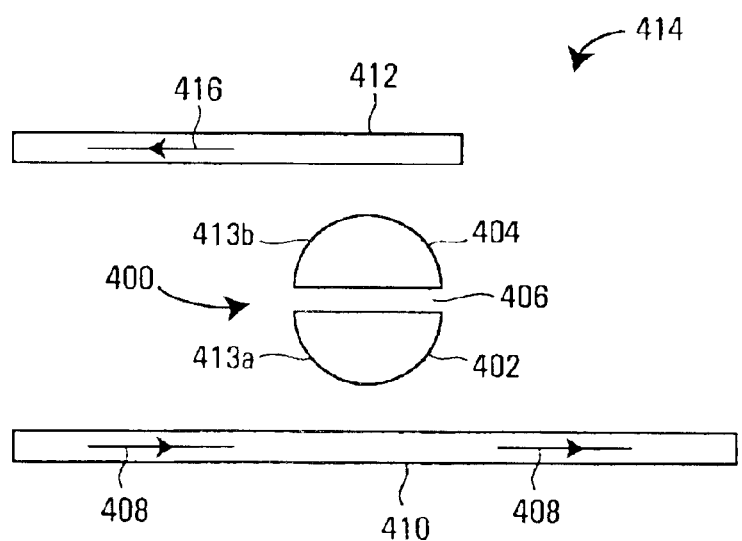
FIG. 12 is an illustration of the microsphere resonator of FIG. 10 in another exemplary optical sensor.

Another type of resonator encompassed within the present teachings is a microsphere resonator such as resonator 400 shown in FIGS. 10–12. Optical micro spheres are known to have exceedingly high Q values, exceeding 1,000,000,000. Microspheres, therefore, provide an ideal resonator for measuring very small changes in a measurable parameter. Known microspheres, however, are formed of unitary structures without gaps or spacings that can be made to vary.

The microsphere 400 is hollow and operates in a whispering gallery mode where light travels along the outer surface of the microsphere 400 like known microspheres. Light is confined by total internal reflection at the surface of the sphere. The microsphere 400 is separated into a first hemisphere 402 and a second identical hemisphere 404, and the two hemispheres 402, 404 are separated by a variable gap 406. The gap 406 is small enough such that a signal propagating within either of the hemispheres 402, 404 will be able to couple into the other for propagation therein.

The microsphere 400 is characterized by a resonant frequency defined by the hemispheres 402 and 404. The spacing of the gap 406 affects the resonant frequency in a similar manner to that of cavity 166 on fiber 160. Referring to FIG. 11, a portion of a laser signal 408 propagating in waveguide 410 is coupled into hemisphere 402. The laser signal 408 will lock onto the resonant frequency within the high Q resonator 400. In operation, as a measurable parameter changes at sensing surface 413a and/or 413b, the variable gap 406 will vary the spacing between the hemisphere 402 and the hemisphere 404 and thereby alter the resonant frequency of the microsphere 400. The resulting variation in the variable gap 406 alters the output frequency of the laser signal 408. The signal 408 is coupled to a measuring apparatus, not shown.

FIG. 12 shows an alternative embodiment, in which the microsphere 400 is disposed between two waveguides 410 and 412, and the microsphere 400 functions as a resonant frequency filter or sensor 414 similar to the structure shown in FIG. 8, producing a filter laser signal 416 in waveguide 412.

The microsphere 400 and waveguides 408 and 410 may be formed over a substrate and mounted using mounting means suitable for ordinary microspheres. The hemispheres 402 and 404 are preferably mounted for movement relative to one another. By way of example, MEMS mounting structures may be used for this purpose. A MEMS fabrication process could be used to create an actuation mounting that biases the hemispheres 402 and 404 to a desired variable gap spacing, but that will allow the variable gap spacing to contract and expand in response to small changes in pressure, temperature, etc. The microsphere 400 is preferably formed of a lasing material, like doped quartz. Though, it may be formed of a non-lasing material instead. Multiple microspheres may be used to increase the signal to noise ratio of the output signal measured at the detector. Other modifications will be apparent.

Figure 13:
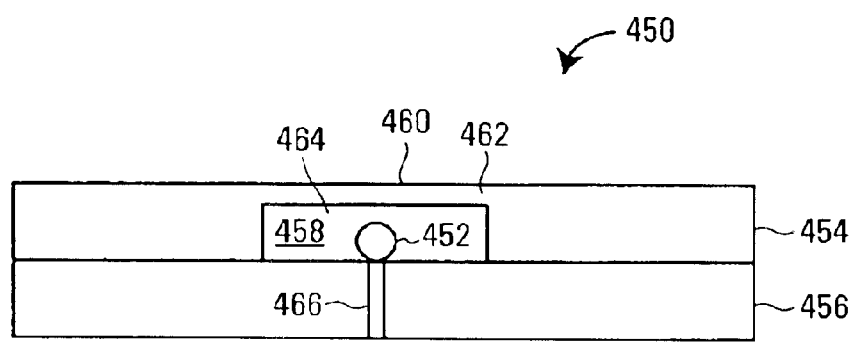
FIG. 13 is a cross-sectional view of an alternative optical sensor having a microsphere.

FIG. 13 shows an alternative optical sensor 450, in the form of an optical sensor capsule, formed with a microsphere 452. In the preferred embodiment, the laser is doped to form a microlaser which lazes when excited by pump light. The sensor 450 is comprised of two modules 454 and 456. The first module 454 is formed of a dielectric material and contains a receiving cavity 458. The module 454 has a sensing surface 460 disposed above a flexible membrane or portion 462, such that changes in a measurable parameter at the sensing surface 460 will deflect the membrane 462. The module 456 is formed of a dielectric material and is disposed in contact with the microsphere 452. For example, the microsphere 452 may be disposed in a small spot indentation in the module 456. The microsphere 452 could be supported by a pedestal. The microsphere 452 is preferably a unitary structure and not formed of halves like the embodiments of FIGS. 10–12. The microsphere 452 is positioned below the membrane 462 and collectively the two define a variable gap 464. In this configuration, light is coupled into the microsphere 452 and changes in the variable gap 464, i.e., changes due to changes in the measurable parameter at the sensing surface 460, will affect the resonance condition in the microsphere 452, thereby changing the frequency of a laser source in CW operation or changing repetition rate of a pulsed laser source in mode-locked operation. By way of example, a waveguide 466 is shown for coupling light in and out of the microsphere 452. Alternatively light could be coupled to the microsphere 452 through the transparent module 454 by focusing a light beam unto the microsphere 452.

The ring resonator embodiments like those of FIGS. 7–8 may be formed integral to a substrate, thereby providing a unitary structure protecting the resonator and waveguides from damage. An exemplary integrated optical sensor 500 is shown (unassembled) in FIGS. 14A and 14B having a first module 502 and a second module 504. The first module 502 includes a ring resonator 506 formed using an implantation, an etch and growth, or other suitable processes. In a preferred embodiment, the substrate 508 is formed of sapphire and the ring resonator 506 is formed of gallium arsenide or polysilicon which have higher indices of refraction than sapphire and thus provide total internal reflection. A primary waveguide 510 and a secondary waveguide 512, similar to the waveguides described above with respect to FIG. 8, have also been formed in the substrate 508. The waveguides 510 and 512 and the ring resonator 506 have top surfaces flush with the top surface 514 of the substrate 508. Signals propagating with the waveguides 510 and 512, as well as the ring resonator 506, do so under total internal reflection.

Figure 14A:
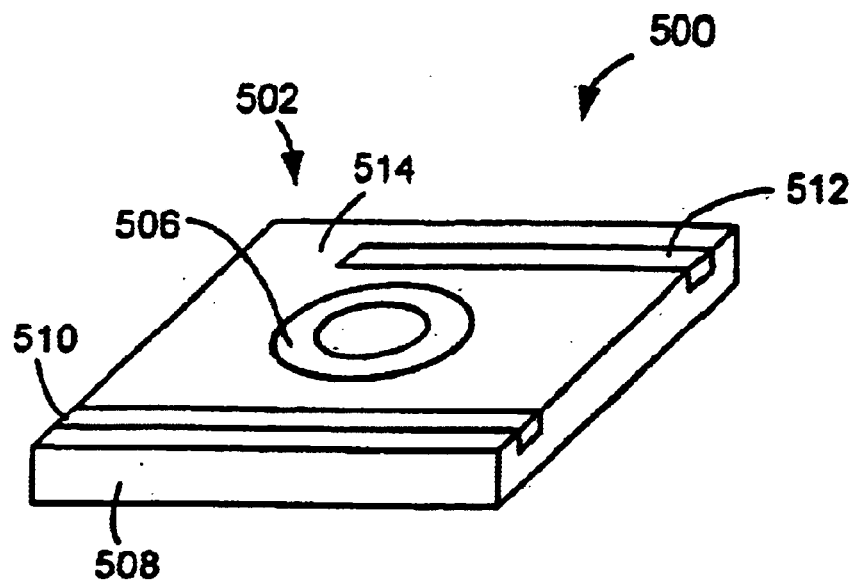
FIGS. 14A and 14B illustrate a perspective view of an unassembled integrated optical sensor with first module and second module in accordance with an embodiment.
Figure 14B:
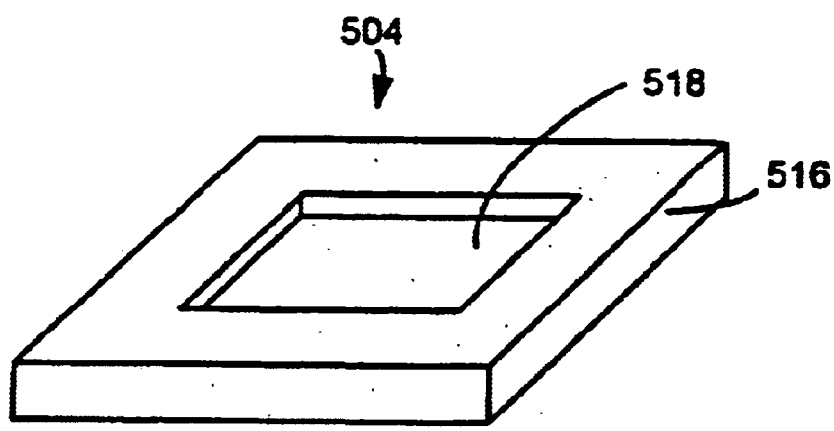

The module 504 is formed of a substrate 516 which in the preferred embodiment would be the same material as that of substrate 508. Module 504 includes a cavity 518 defining a variable gap. As with the cavity 166 previously described, the cavity 518 has a geometry such that the gap of the cavity 518 will vary in response to changes to a measurable parameter, like pressure, force or temperature. Furthermore, while a rectilinear shape is shown in FIGS. 14A and 14B, it will be understood that other shapes are suitable; for example, a non-planar shape may be used. The integrated optical sensor 500 is formed by mounting module 504 on module 502 forming the structure shown in FIG. 15.

Figure 15:
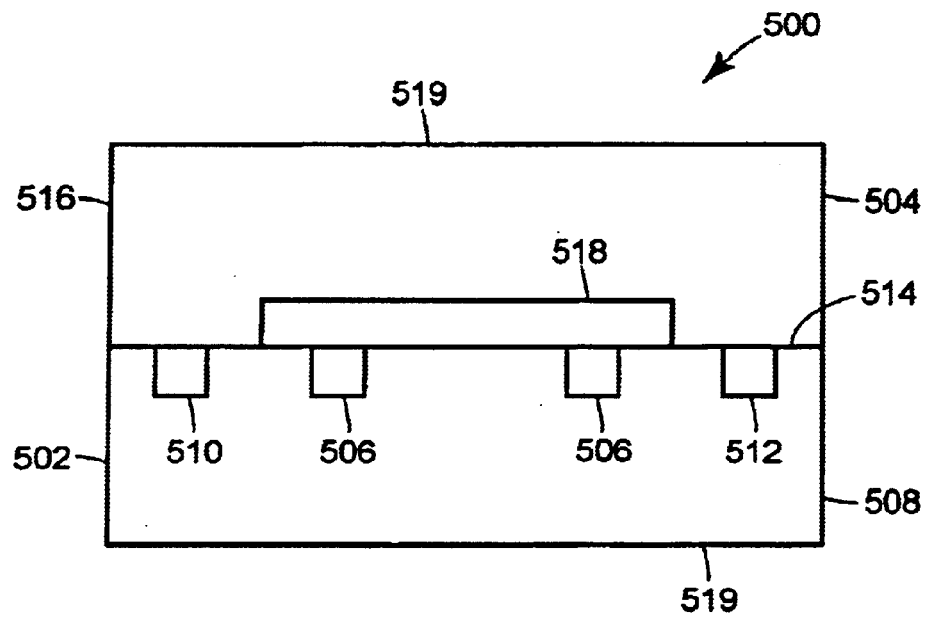
FIG. 15 is a cross-sectional view of the integrated optical sensor of FIG. 14 assembled.

As shown in cross-section in FIG. 15, the cavity 518 is external to the ring resonator 506, but close enough to alter the effective index of refraction experienced by a wave propagating within the ring resonator 506. The shape of the cavity 518 is altered in response to changes to the measurable parameters described above at sensing surfaces 519, and variations in the variable gap change the resonant frequency of the resonator 506. The module 504 may, for example, form a diaphragm above the resonator 506. The output signal on waveguide 512 is coupled to a detector and processor. The configuration could be used in a CW or pulse mode operation in accordance with the above teachings.

Numerous alternatives to the optical sensor 500 will be apparent to persons of ordinary skill in the art. For example, a Bragg grating may be formed on a surface of the resonator 506 to further narrow the bandwidth of the output signal from waveguide 512 or otherwise affect operation. The ring resonator 506 could be doped to provide integral lasing action or the ring resonator 506 could be coupled to an external laser to provide a variable frequency output. Additionally, concentric ring resonators may be used, for example, to compensate for temperature fluctuations. This alternative is particularly useful as each of the concentric ring resonators would have different pressure sensitivities due to differing geometries (in this case radii).

Figure 16:
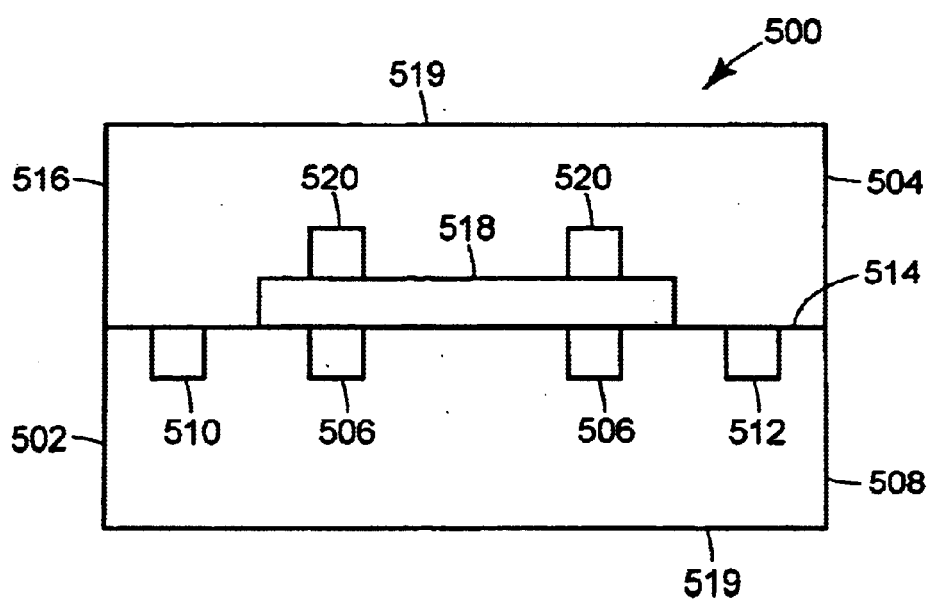
FIG. 16 is a cross-sectional view of the an alternative integrated optical sensor to that shown in FIG. 15.

Even further, the optical sensor 500 could be formed of symmetrical and identical opposing ring resonators existing on opposite sides of the cavity 518. The two waveguides would act as a single mode waveguide with a variable internal gap. FIG. 16 shows the cross-section of an embodiment in which a second ring resonator 520 is disposed above the cavity 518 and over the ring resonator 506.

Alternative to the two module structure shown in FIG. 14, the optical sensor 500 can be formed in a single substrate structure, i.e., without modules. Here, multiple step processing may be employed in which a first portion of a substrate layer is grown and then implanted or etched processed to form the integral ring resonator and necessary waveguides and then a subsequent growth stage would be performed to form the cavity on the top surface of the sensor.

Figure 17:
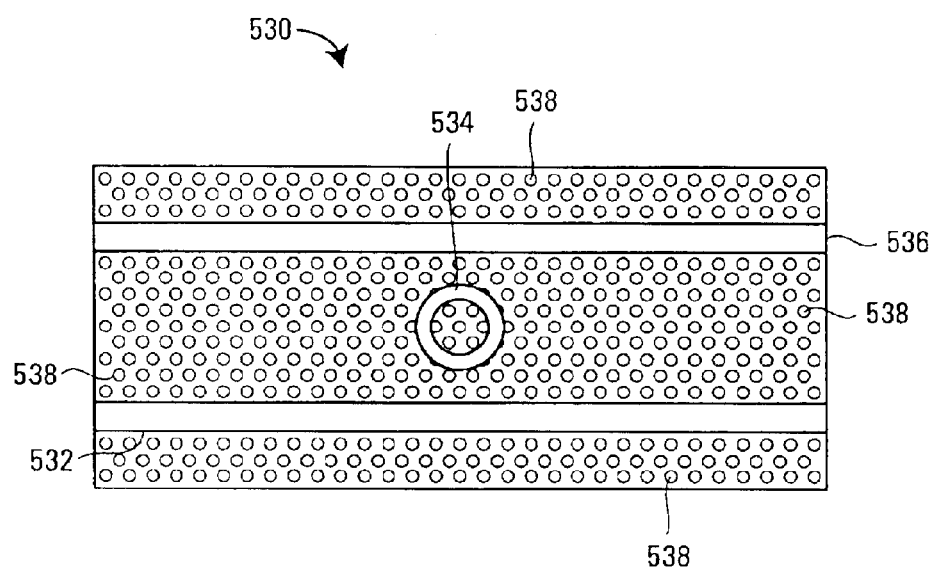
FIG. 17 is a top view of an alternative to the first module of FIG. 14 using a photonic crystal array to form a resonator.

The first module 502 may be alternatively formed of a photonic crystal module 530 as shown in FIG. 17. The module 530 has a primary waveguide 532, a resonator 534, and a secondary waveguide 536. The module 530 may be used with the module 504, as an alternative to module 502, or the module 530 may be formed with a variable gap cavity in a unitary structure. The resonator 534 is formed by a change in the spacing in the photonic crystal array as is known in the art.

The waveguides 532, 536 and the resonator 534 are formed in a 2D photonic crystal lattice array. A photonic crystal generally consists of a repetitive array of elements where the dimensions for each element are similar to or on the order of the wavelengths of light to propagate within the array. Photonic crystals are desirable because they have tight mode confinement and low losses even with sharp corners in the waveguide. They also allow for evanescent coupling. As a result, the module 530 is a low loss optical coupler, and the resonator 534 is a high Q resonator.

The module 530 is formed with a 2D array of holes or posts 538 configured in a triangular lattice orientation. The array may be formed using known photonic crystal formation techniques. For example, collimated optical beams may bore holes through an optical substrate material. Lithographic processes by which electron beams directly write the patterns to be etched in thin membrane or heterostructures are also known. The formed 2D photonic crystal array defines the resonator 534 as well as the waveguides 532, 536 and therefore a single processing step may be used to form these three structures simultaneously.

In the module 530, a laser signal propagating within the primary waveguide 532 will evanescent couple into the resonator 534, a ring resonator. As with the other resonators described herein, the resonator 534 may be formed of lasing material or non-lasing material. The signal from the resonator 534 is coupled to the waveguide 536. The module 530 is preferably used with the external cavity 518, where changes to the sensing surface 519 will alter the variable gap of the cavity 518 and the frequency of the resonator signal from the resonator 534. The structure 530 may be a module for replacing module 502. However, the structure 530 may be used as a ring resonator and waveguide for any of the actuator-based tunable filter or sensing examples described herein.

Though the embodiments shown in FIGS. 14–17 show a primary, or input, waveguide and a secondary, or output, waveguide, it will be understand that a single waveguide may be used as in FIG. 7.

Figure 18:
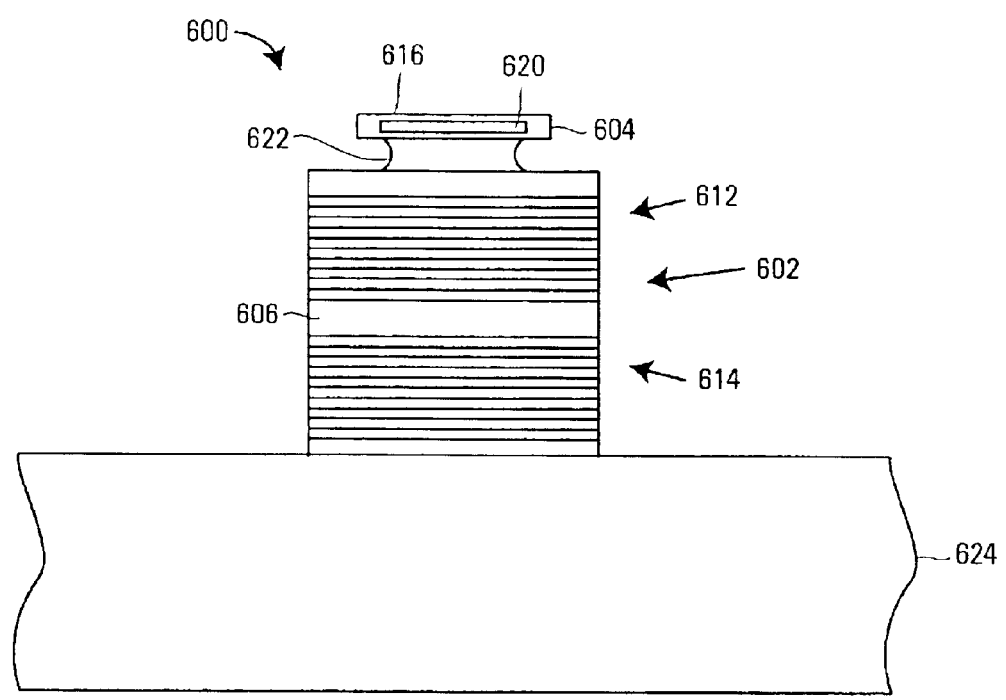
FIG. 18 is a cross-sectional view of a microdisc resonator and VCSEL in accordance with an embodiment.

FIG. 18 shows another embodiment of an optical sensor 600. The optical sensor 600 is formed of a vertical cavity surface emitting laser (VCSEL) 602 having an output coupled to an external resonator 604. The VCSEL 602 exemplarily includes an active region 606 and two reflectors 612 and 614, each being distributed Bragg reflector layers in the preferred embodiment. The resonator 604 is a microdisc resonator operating on the principle of total internal reflection and thus has low losses and a high Q. The resonator 604 has a cavity 620 defining a variable gap that varies in response to changes in a measurable parameter at a sensing surface 616. The resonator 604 is mounted to the top surface of the VCSEL 602 for receiving the output from the VCSEL 602. By way of example, a transparent dielectric 622 is shown for this purpose. The entire sensor 600 could be mounted on a substrate or support layer 624 for easy packaging and placement in existing applications.

In this embodiment, the output from the resonator 604 depends upon the resonant frequency thereof. The resonant frequency is a function of the variable gap of the cavity 620 and that variable gap is a function of the measurable parameters like pressure and temperature. The VCSEL output is coupled to the high Q microdisc 604 to determine the frequency of the VCSEL 602.

As can be seen from the foregoing, a high Q optical resonator with a resonant frequency that is dependent upon a measurable parameter such as pressure, temperature, flow rate, force, material composition, or strain is shown. The resonant frequency of the resonator determines the output frequency of a laser, by having the laser lock onto the resonant frequency, or the resonant frequency may determine the output of a resonator acting as a filter. The output of either is dependent upon the measurable parameter at a sensing surface and can be used to calculate an absolute or differential value for the measurable parameter. The resonator may be formed of an optical medium external to a laser or light source or the optical medium may be internal to the source making the laser cavity the resonator. Numerous waveguides are described above including dielectric resonators like the microdisc and microsphere that rely only upon total internal reflection, as well as resonators that do have waveguides for confining propagating signals. In addition to those shown, other resonator structures will be apparent.

Numerous applications for these teachings have been described above and yet others will be apparent. The high accuracy of the described optical devices is well suited for industrial process and flow system applications, particularly those with low signal strengths where conventional electronic based semiconductor sensors often do not work. In one application, an optical remote pressure sensor could be used where the optical resonator replaces an oil filled capillary tubing. Another application includes ΔP flow meters where pressure is measured in physically separated locations, and a meter is used to determine the change in pressure. In contrast, conventional ΔP sensors require an oil filled isolator system to couple the two physically separated pressures to a common sensor. The optical sensors are also suitable for pressure measurement in high temperature applications where conventional sensors and electronics do not operate, for example, measuring pressure in jet engines, measuring pressure in oil wells and measuring steam. The structures shown could also be used in ΔP transmitters where the ΔP must be measured at high line pressure (AP). Here dual AP optical sensors with high sensitivity could be used. Even further, temperature measurement applications where conventional wiring is not suitable due to electrical interference or safety considerations can now be achieved through the use of all optical sensors. Other sensor applications include using optical sensors to measure flow rate and material composition.

It is also contemplated to control the resonant frequency of high Q resonators, which can be used to perform adjustable filtering or to control laser frequencies. In some embodiments, the resonance frequency is controlled by controlling measurable parameters at the sensing surface, for example, by setting the temperature or pressure there to an amount that results in a desired resonant frequency. Preferably, however, an actuator is used.

Figure 19:
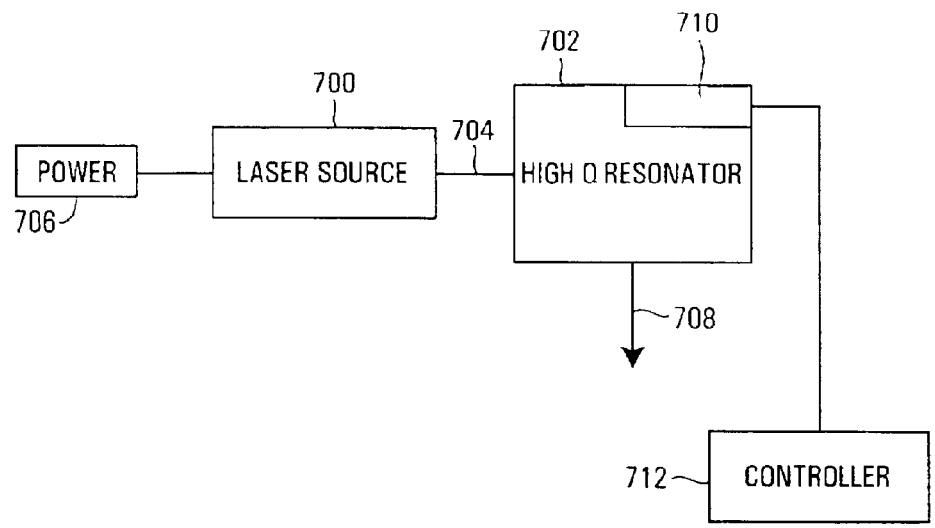
FIG. 19 is a block illustration of a laser source and high Q resonator including an actuator, in accordance with an embodiment.

FIG. 19 depicts an exemplary actuation embodiment showing a laser source 700 coupled to an external high Q resonator 702 via a coupler 704. FIG. 19 is similar to FIG. 1 in that the laser source 700 may be any of the sources described above with respect to laser source 100, however, FIG. 19 contemplates using a continuous wave laser source. The laser source 700 receives power from a power source 706, which would be an electrical or optical power source, and output from the high Q resonator 702 is provided at output port 708.

FIGS. 19 and 1 both depict external high Q resonator embodiments, yet, the high Q resonator 702 of FIG. 19 further includes an actuator 710 controlled by a controller 712. Any of the high Q resonators described herein may form the resonator 702. The resonator 702 is characterized by a resonance condition that is dependent upon changes in a variable gap, where that variable gap has different forms depending on the type of resonator used and is controlled by the actuator 710. The variable gap may be defined by a cavity internal or external to the resonator, as exemplified in various embodiments above. Furthermore, the variable gap may be defined by a high Q resonator in proximity to a perturbation-forming dielectric plate, optical film, layer, or other structure. In all such embodiments, the actuator 710—under control of the controller 712—sets the resonant frequency of the resonator 702 by controllably changing the variable gap. As such, the actuator 710 is made to selectively tune the resonant frequency of the high Q resonator 702.

Figure 20:
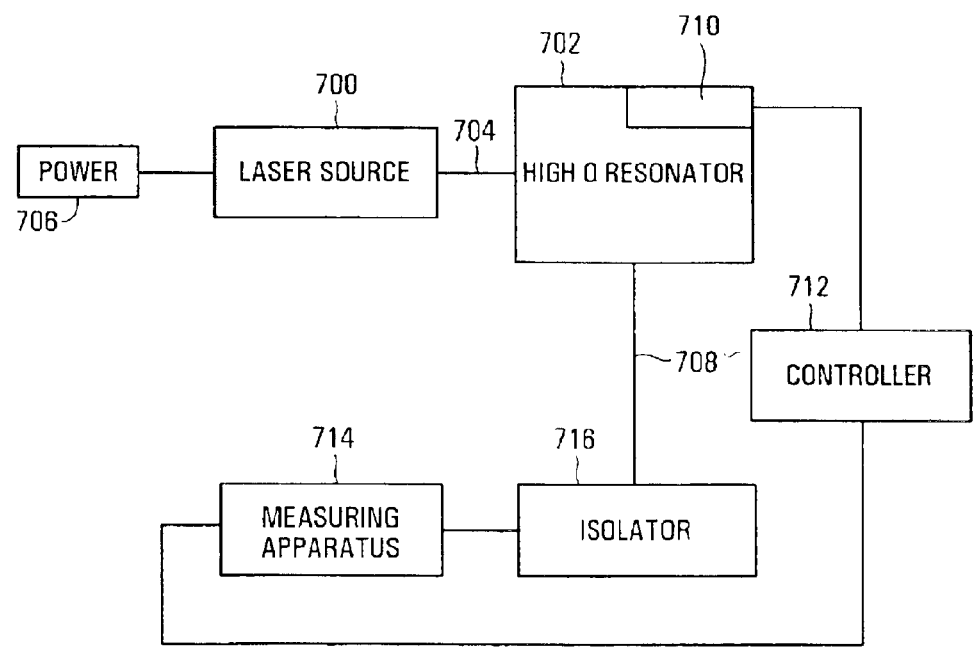
FIG. 20 is a block illustration of a laser and high Q resonator including an actuator, in accordance with another embodiment.

In an alternative embodiment, the controller 712 is part of a feedback loop, as shown in FIG. 20. The filtered signal at output port 708 is passed through an isolator 716 to a measurement apparatus 714, like the isolator 136 and measurement apparatus 106, described above. The output signal of the measurement apparatus 714 is fed to the controller 712 for controlling the actuator 710. In the preferred embodiment, as the actuator 710 is used to controllably tune the resonant frequency of the external high Q resonator 702, the measuring apparatus 714 measures the frequency of the signal from output 708 or alternately measures a physical property of the high Q resonator 702, such as a gap height or the temperature of the resonator near the actuator 710. The measurement(s) is(are) then used by the controller 712 to adjust the actuator 710 to thereby tune the resonant frequency of the high Q resonator 702 to a desired value.

Figure 21:
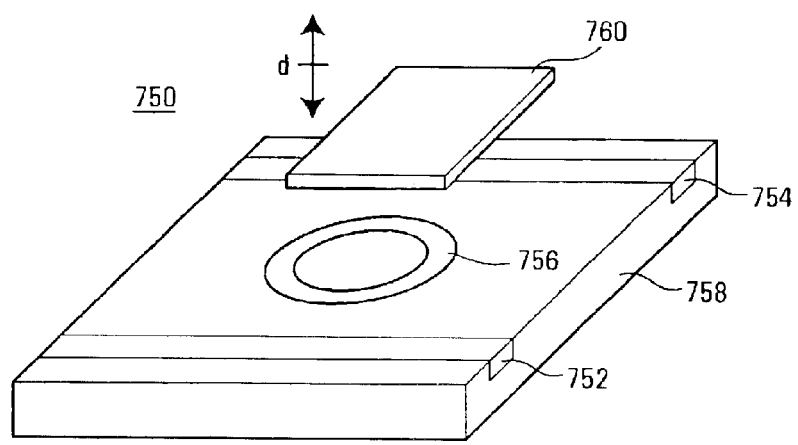
FIG. 21 is an illustration of a tunable filter having a ring resonator and a dielectric plate, in accordance with an embodiment.

Actuation may be implemented in numerous ways. FIG. 21, for example, shows a tunable filter 750 with a primary waveguide 752, a secondary waveguide 754, and a ring resonator 756 all disposed in a substrate 758. A dielectric plate 760 is positioned above the ring resonator 756 and is disposed for vertical movement relative thereto, i.e., planar movement toward and away from the top surface of the substrate 758.

In operation, a laser signal or laser energy propagating within the primary waveguide 752 is coupled into the ring resonator 756 and filtered or tuned to the resonant frequency of the ring resonator 756. The filtered energy is coupled from the ring resonator 756 into the secondary waveguide 754. To tune the resonant frequency of the ring resonator 756, the dielectric plate 760 moves in the vertical direction, d. As the dielectric plate 760 is moved closer to the ring resonator 756, the plate 760 increasingly perturbates the propagation properties within the resonator 756, which in turn changes the resonance conditions in the resonator 756. Thus, the plate 760 and the ring resonator 756 define a variable gap external to the resonator 756. The variable gap height may be continuously adjusted by moving the plate 760 to tune the resonant frequency of the high Q ring resonator 756 across a range of frequencies.

The dielectric plate 760 is formed of an optically transparent material that is configured to maintain single mode, low loss operation of the waveguide. It is preferably a material with an index of refraction lower than that of the ring resonator 756 and a thickness adjusted so that no energy is radiated out of the system during operation. Also, the plate 760 may be formed of a material different than that of the ring resonator 756 to avoid coupling loss into the dielectric plate 760. The plate 760 may be of various shapes and sizes so long as it is large enough and/or positioned close enough to interact with the ring resonator 756 without radiating significant energy out of the resonator 756.

The ring resonator 756 and waveguides 752, 754 may be formed of materials provided above. Silicon for example allows the ring resonator to have a very small radius of curvature. The ring resonator 872 as well as the other high Q resonator structures described herein may also include a Bragg filter to enhance filtering. A Bragg filter may be formed by varying the index of refraction or cross sectional dimension along the length of the ring resonator. The Bragg filter allows the resonator to operate at only one wavelength determined by the spacing of the filter elements. This helps eliminate the possibility of overlapping resonance modes in the filter operating range. In other words, the resonator has an increased free spectral range. With larger diameter resonators, a wider range of materials may be used to form the resonators.

Figure 22:
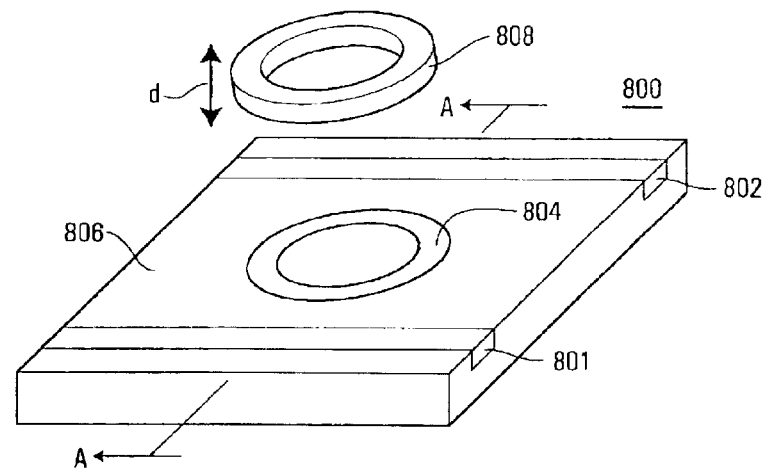
FIG. 22 is an illustration of a tunable filter having a first ring resonator and a second ring resonator movable relative to the first ring resonator, in accordance with an embodiment.

FIG. 22 shows an alternative example to the structure of FIG. 21 where a tunable filter 800 has a primary waveguide 801, a secondary waveguide 802, and a ring resonator 804 all formed within a substrate 806. The dielectric plate is a ring resonator 808 that moves along a vertical direction, d. The ring resonator 808 is preferably formed of a material similar to that of ring resonator 804 and with a similar index of refraction. It is also preferred that the ring resonator 808 be thin enough so that the coupled ring resonators 804 and 808 exhibit single mode operation over the frequency tunable range. The ring resonator 808 may be formed of a polysilicon material, which as is known is partially conductive.

Figure 23A:
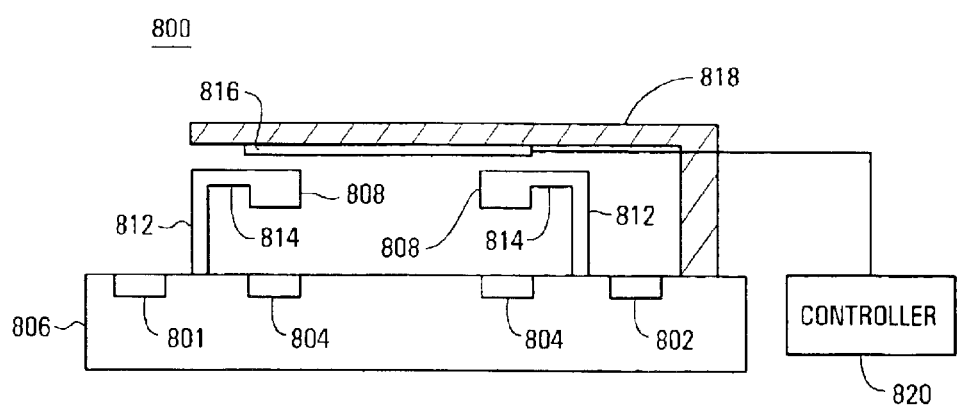
FIG. 23A is a cross-sectional view of the structure of FIG. 22 and including an actuator, in accordance with an embodiment.

The ring resonator 808 may be moved via electrostatic actuation. FIG. 23A illustrates a side view of such an exemplary actuation taken along lines AA of FIG. 22 and showing additional structure. The ring resonator 808 is suspended above a substrate top surface 810 by two posts 812. These and other identical support posts may be positioned around the ring resonator 808 to prevent unwanted rotation during vertical movement. The posts 812 are preferably MEMS fabricated structures formed of a polysilicon material, though any rigid load-bearing materials amenable to small-scale fabrication techniques may be used. The ring resonator 808 is suspended on the posts 812 by extension arms 814 that allow vertical movement of the ring resonator 808. The extension arms 814, the posts 812, and the ring resonator 808 may form an integrated structure formed entirely of a polysilicon material.

A conductive, actuating plate 816 extending over and above the ring resonator 808 uses electrostatic force to move the ring resonator 808. The plate 816 may have a ring shape, a circular shape or rectangular shape when viewed from above, for example. Furthermore, by way of example, the plate 816 is shown mounted to a support 818 that is rigidly mounted to the substrate 806 or other structure through a cantilevered arm, C-channel member, posts, or other means. The support 818 may be eliminated and the electrode 816 may be mounted directly to the substrate 806 or other structure.

The actuating plate 816 is connected to controller 820, generally shown, which contains control circuitry or a processor for applying an electrostatic charge differential to the plate 816—the differential being between the plate 816 and the conducting polysilicon ring resonator 808. As depicted, the ring resonator 808 is biased for deflection away from the plate 816, however electrostatic force may be used to pull the ring resonator 808 toward the plate 816, if so desired. Bumps may be used on the lower surface of the ring resonator 808 and/or on the upper surface of the ring resonator 804 to prevent direct contact and sticking between the two.

The controller 820 may be part of a feedback loop that measures certain actuator parameters and uses these measurements to further control the charge differential between the plate 816 and the ring resonator 808. For example, measurement of the position of the ring resonator 808, the frequency of the energy from waveguide 802, or the temperature near the top surface 810 of the substrate 806 may be determined.

Figure 23B:
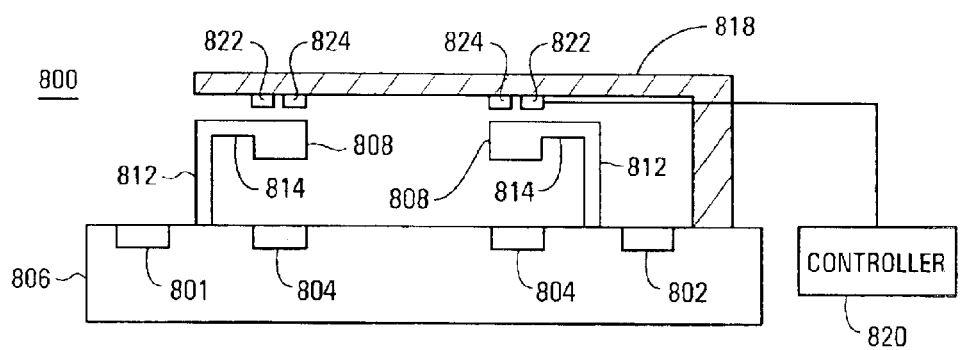
FIG. 23B is a cross-sectional view of the structure of FIG. 22 and including an actuator, in accordance with another embodiment.

FIG. 23B shows the optical device 800, except the electrode plate 816 has been replaced by two electrode plates 822 and 824, both being coupled to the controller 820. The first electrode plate 822 may receive a DC drive signal to controllably deflect the ring resonator 808, while the second electrode plate 824 may receive an AC measurement signal for measuring a capacitance difference between the electrode 824 and the ring resonator 808. The capacitance measurement may then be used by the controller 820 to determine a deflection distance and thus the variable gap height. By accessing stored look-up data for the variable gap height as a function of tuned frequency, the controller 820 may use the measured capacitance to determine the amount of DC drive signal needed to achieve the desired resonant frequency of the ring resonator 804.

Figure 24:
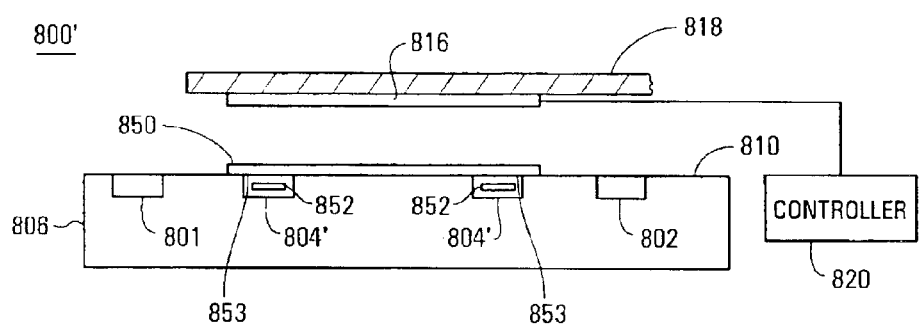
FIG. 24 is a cross-sectional view of a ring resonator tuned via an actuation in accordance with yet another embodiment.

An alternative actuation mechanism for the substrate 806 is shown in FIG. 24, where like reference numerals have been retained. Tunable filter 800' includes an optically transparent conductive layer 850 that has been deposited, grown or mounted directly on the ring resonator 804', which includes a cavity 852 defining an internal variable gap. The top surface of the ring resonator 804' may be a sensing surface 853, by which the internal variable gap changes in response to changes in a measurable parameter.

In this illustration, the conductive layer 850 applies a force to the sensing surface 853 in response to a potential difference being applied across the electrode 816 and the conductive layer 850. The force alters the height of the cavity 852 and thus changes the resonance condition of the high Q resonator 804'.

The conductive layer 850, actuating plate 816, and support 818 are optional. The resonant frequency of resonator 804' may instead be set by controlling the value of a measurable parameter at the sensing surface 853. Additionally, various other methods of applying a force to the sensing surface 853 in a controlled manner may be used and include piezoelectric, magnetic, and thermal actuators. Furthermore, while the spacing between the electrodes 816 and 853 may be determined by the controller 820, the two electrodes 816 and 853 may be replaced with electrode pairs, where one pair performs drive actuation and the other pair variable gap height sensing.

The embodiments of FIGS. 21–24 illustrate coupling between a waveguide and an in-substrate ring resonator such that a traveling wave is established within the ring resonator. Alternative coupling configurations are used to form standing waves instead. These are preferred where the energy within the resonator is to be without a direction of propagation, as is characteristic of traveling waves.

Figure 25:
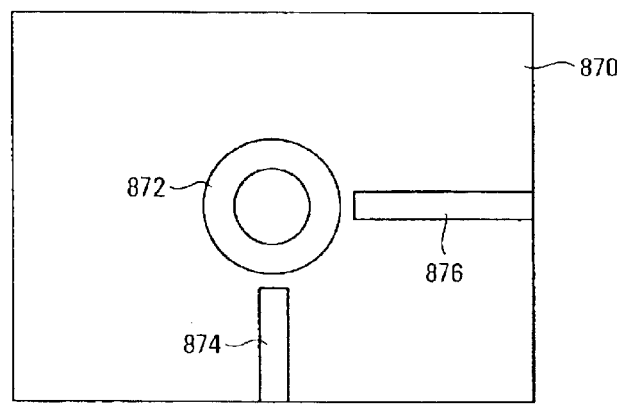
FIG. 25 is a top-view of a ring resonator that may be used in a tunable filter having a standing wave of configuration.

FIG. 25 shows an alternative substrate 870 that may be used in any of the embodiments shown in FIGS. 21–24. The substrate 870 includes a ring resonator 872, as well as a primary waveguide 874 and a secondary waveguide 876. Both waveguides 874 and 876 are terminated adjacent the ring resonator 872 and extend radially therefrom. Both are positioned along the circumference of the ring resonator 872 and couple to nodes or antinodes in the standing wave. In this configuration, a signal on waveguide 874 locks onto the resonant frequency of the high Q resonator 872 resulting in an output signal, or energy, in the second waveguide 876 at that resonant frequency.

Figure 26:
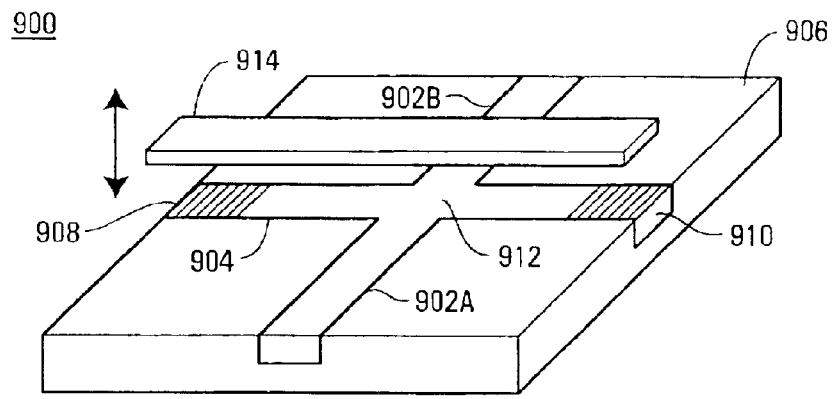
FIG. 26 illustrates a standing wave tunable filter in accordance with an embodiment in which the high Q resonator is formed by Bragg reflectors.

Another standing wave ring resonator is depicted in FIG. 26. A tunable filter 900 includes a first waveguide 902 (having an input portion 902A and an output portion 902B) and resonator waveguide 904 that overlap as shown. By way of example, the waveguides 902, 904 are formed within a substrate 906, though alternatively the waveguides 902, 904 may be separate waveguides, such as crossed, fused optical fibers.

The first waveguide section 902A functions as an input waveguide propagating an input signal, or energy, e.g., from a laser source. The input energy is coupled into the waveguide 904 that forms a high Q resonator due to the Bragg reflectors 908, 910 at its opposing ends. Coupling occurs in an coupling region 912, though evanescent coupling is also contemplated for non-overlapping structures.

The energy absorbed into the waveguide 904 is tuned and a narrower-bandwidth output energy is coupled into waveguide 902B. A dielectric plate 914 is disposed for movement relative to the waveguide 904 for controllably tuning the resonance frequency of the high Q resonator. The dielectric plate 914 may extend over the entire waveguide 904 or a portion thereof, for example, over only the coupling region 912 or the Bragg reflectors 908, 910. As with the dielectric plate 756, the dielectric plate 914 is formed of a material that promotes perturbation of the energy within the waveguide resonator 904 but does not couple energy from the waveguide resonator 904. Any of the actuators described herein may be used to move the plate 914. Preferably, electrostatic, thermal, or magnetic actuation is used.

Figure 27A:
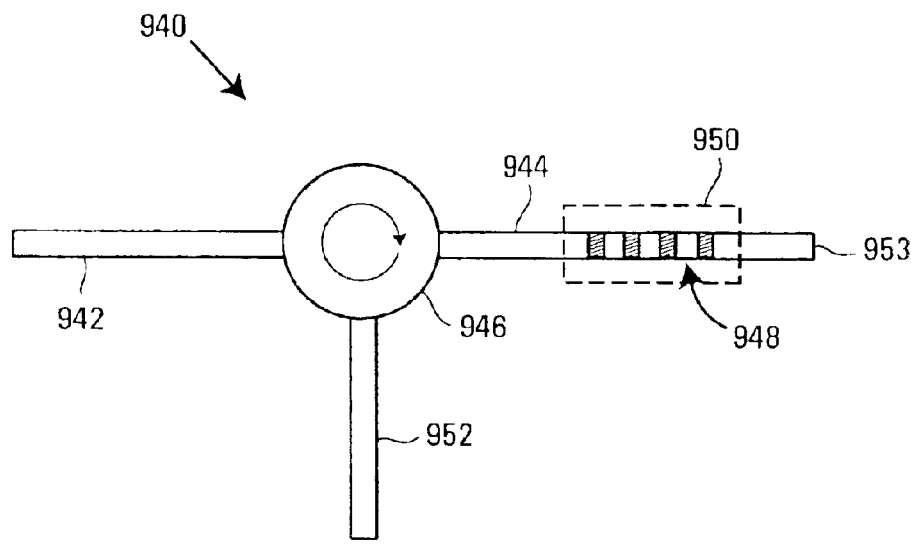
FIG. 27A is a top view of a tunable Bragg channel drop filter in accordance with an embodiment.
Figure 27B:
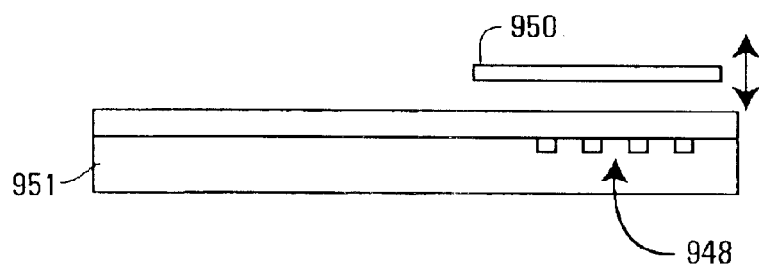
FIG. 27B is a side view of the tunable waveguide of FIG. 27A showing a dielectric plate disposed above a Bragg grating.

Extending the example of FIG. 26, FIG. 27A shows a tunable channel drop filter 940. The filter 940 includes an input waveguide 942 and a tunable waveguide 944 coupled to a circulator 946. The tunable waveguide 944 includes a Bragg grating 948. The Bragg grating 948 is tunable via a dielectric plate 950 disposed adjacent the Bragg grating 948 and moveable relative thereto. A side view of a portion of the filter 940 is shown in FIG. 27B. For example purposes, the waveguide 944 is shown formed in or over a substrate 951. The dielectric plate 950 is shown preferably spaced out of direct contact with the Bragg grating 948 and moveable relative thereto to affect the operation of the Bragg grating 948 through an evanescent coupling. The dielectric plate 950 may be actuated for movement via any of the actuators described herein or via known actuators.

The circulator 946 is generally shown and may be any known circulator, e.g., a three-port fiber circulator. The circulator 946 functions to route signals to different output ports according to the direction of an input signal. For example, a signal along input waveguide 942 may be routed to waveguide 944, whereas a signal from waveguide 944 may be routed to a drop waveguide 952. In operation, a wideband input signal is transmitted on waveguide 942 and coupled into the circulator 946. The circulator 946 routes that wideband signal to the waveguide 944, and a narrow-band signal, at a tuned frequency, is reflected by the Bragg reflector 948 back to the circulator 946 for routing that narrowband signal to the drop waveguide 952. The Bragg grating 948 is tuned by the relative movement of the dielectric plate 950. The remainder of the wideband signal not reflected appears at an output port 953 for routing to another channel drop filter, detector, or other structure. So for a multi-channel input, channels that are not reflected or dropped continue to the port 953.

The Bragg filter 948 is formed of alternating Bragg filter elements. As would be known to persons of ordinary skill in the art, the Bragg grating 948 may be formed by forming the waveguide 944 with dielectric sections of alternating indices of refraction, as may be achieved through photolithography techniques. Also, variable width or thickness Bragg filter elements may be used. Further still, while the example of FIGS. 27A and 27B show a dielectric plate that moves relative to a Bragg grating, either or both the dielectric plate and the Bragg grating may be made to move relative to the another. For example, in an alternative embodiment, the dielectric plate could be held fixed, and the Bragg grating could be formed on a flexing support or substrate and made moveable relative to the dielectric plate.

Figure 28A:
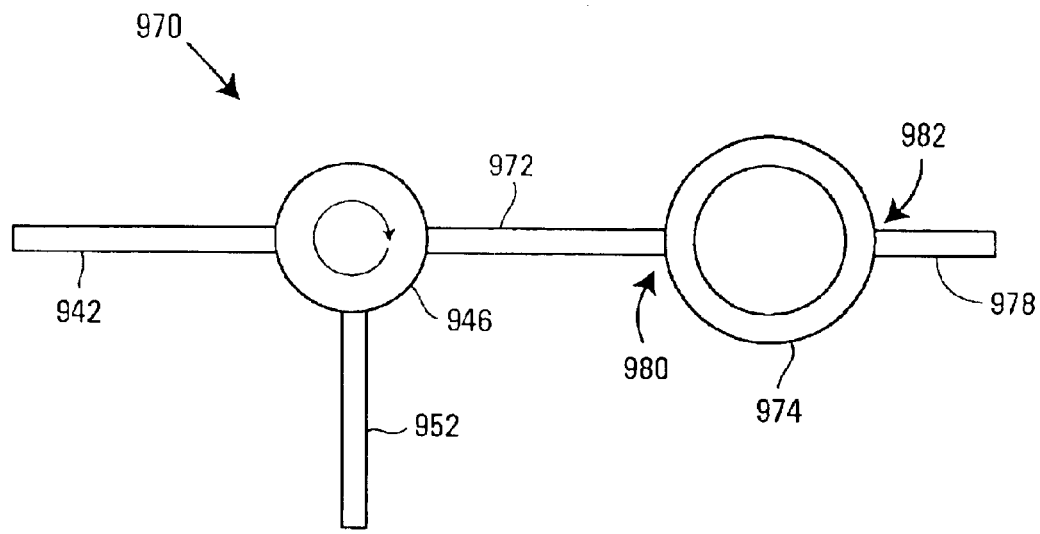
FIG. 28A is a top view of an alternative tunable filter having an external ring resonator.

Another tunable filter 970 is shown in FIG. 28A, where like components to those of FIG. 27A are noted. The tunable filter 970 has a waveguide 972 in place of the tunable waveguide 944. The waveguide 972 couples energy into the circulator 946 like the waveguide 944. A ring resonator 974 is coupled to the waveguide 972 to tune the resonant frequency of the system and, therefore, set the frequency of the output signal on drop waveguide 952.

Figure 28B:
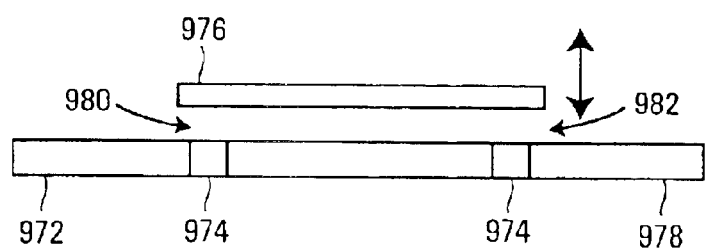
FIG. 28B is a side view of the tunable waveguide and ring resonator of FIG. 27B showing a dielectric plate moveable relative to the ring resonator.

In operation, the ring resonator 974 is positioned below a dielectric plate 976 that moves relative to the ring resonator 974, as shown in FIG. 28B. The movement tunes the properties of the ring resonator 974 and, therefore, the properties of the tunable filter 970. The ring resonator 974 preferably includes a Bragg grating, which will suppress unwanted multiple resonances and increase free spectral range. In addition, using a Bragg grating allows a physically larger ring resonator to be used without concern for added resonance modes. Larger ring resonators may have lower radiation losses and, thus, larger Q factors.

The ring resonator 974 may be coupled to the waveguide 972 and an output waveguide 978 through couplers or coupling regions, generally shown as 980 and 982, respectively. Any signals or channels not reflected or dropped by the system, will continue to waveguide 978, which may couple its output to a detector, channel drop filter, or other downstream structure, as desired.

Figure 29:
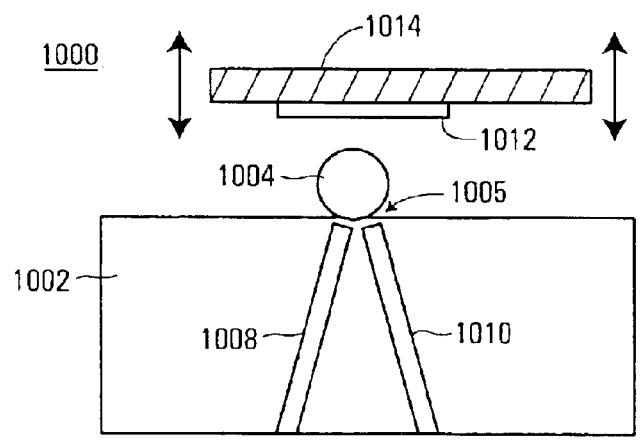
FIG. 29 is a cross-sectional view of another standing wave tunable filter in which the high Q resonator is a microsphere.

FIG. 29 shows an example of a microsphere resonator in a standing wave configuration. Tunable filter 1000 includes a substrate 1002 with a microsphere 1004 disposed at a top surface 1006. The microsphere 1004 may be a two-hemisphere structure like structure 400 in FIG. 10, though in the preferred embodiment of FIG. 26 it is a unitary structure. The microsphere 1004 rests in a recess 1005 or on a pedestal. An input waveguide 1008 is formed in the substrate 1002 through known means, such as through laser writing. The waveguide 1008 and an output waveguide 1010 extend radially from near the microsphere 1004.

Absorbed energy from waveguide 1008 is coupled into the microsphere 1004 forming a standing wave in the outer shell of this resonator. To perturb propagation within the microsphere 1004, a dielectric plate 1012 is disposed above the microsphere 1004 on a moveable support 1014. The support 1014 may be mounted to an electronically-controllable-vertically-moving support, for example, a MEMs fabricated structure movable via electrostatic actuation. As the dielectric plate 1012 is moved closer to and further from the microsphere 1004, the resonance frequency in the tunable filter 1000 is altered, which results in a change to the frequency of the energy coupled into the waveguide 1010. As with the dielectric plate 756, the dielectric plate 1012 is formed of a material that promotes perturbation of the energy within the microsphere 1004 but does not couple energy from the microsphere 1004. In the illustrated example the support 1014 may move by electrostatic, magnetic, thermal, or mechanical actuation. Furthermore, the dielectric plate 1012 may be part of a capacitance-based sensing circuit that determines the position of the plate 1012, and thus the support 1014, in case further adjustment to position is desired.

Figure 30:
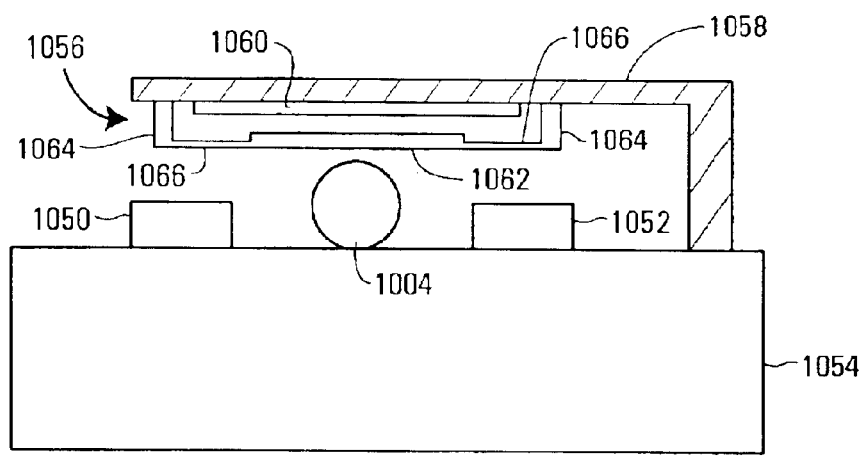
FIG. 30 is a cross-sectional view of a microsphere tunable filter in a traveling wave configuration, in accordance with an embodiment.
Figure 31:
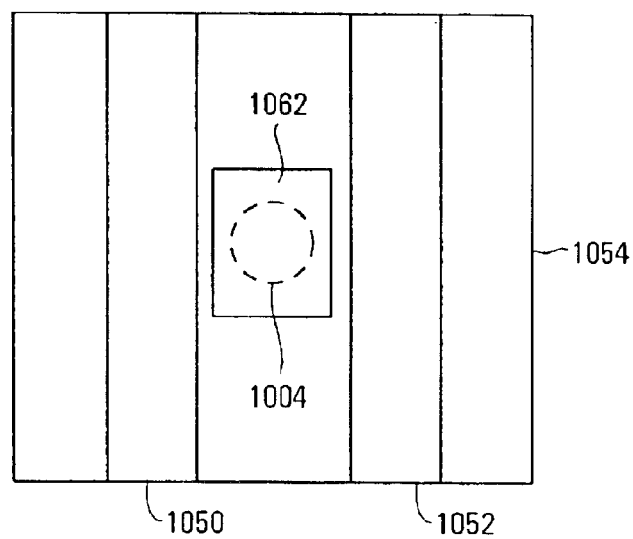
FIG. 31 is a top-view of a portion of the structure of FIG. 30 showing the microsphere in a dashed line.

FIGS. 30 and 31 illustrate a tunable filter 1040 having a microsphere in a traveling wave configuration. An input signal or energy propagates in a first waveguide 1050 and is coupled to the microsphere 1004, which couples a tuned frequency output signal, or energy, to a second waveguide 1052. The waveguides 1050 and 1052 are formed on a substrate 1054.

An actuator 1056 is positioned above the microsphere 1004 and includes a support member 1058 and charge plate 1060. The support member 1056 may be rigidly mounted to the substrate 1053. A movable dielectric plate 1062 is suspended below the charge plate 1058 by supports 1064, where additional stabilizing supports (not shown) may also be used. Flexible arms 1066 connect the dielectric plate 1062 to the supports 1064 and allow for the plate 1062 to deflect vertically in response to changes in the potential between the charge plate 1058 and the dielectric plate 1062. The charge plate 1058 and the plate 1062 may also form part of the position sensor that can be used to determine the amount of movement of the plate 1062.

The dielectric plate 1062 is sized to cover the microsphere 1004, but not to interfere with signal propagation within waveguides 1050 and 1052. The plate 1062 is preferably formed of a conducting or semi-conducting material, such as a silicon material. The plate 1062 may also be enhanced with a conductive layer to increase or create responsiveness to electrostatic forces, as is the case for all dielectric plates described herein. FIG. 31 shows a top view of the tunable filter of FIG. 30, with the substrate 1058, charge plate 1060, supports 1064, and arms 1066 removed and with the covered microsphere 1004 shown in a dashed line.

Figure 32:
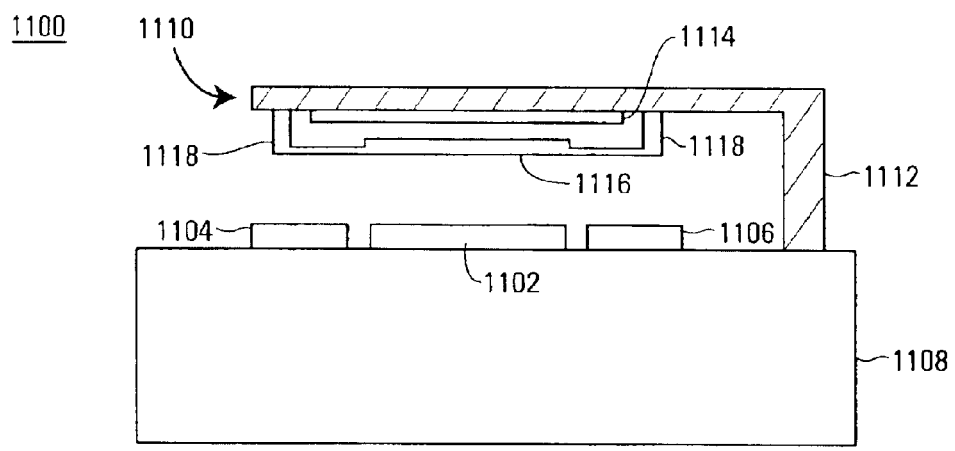
FIG. 32 is a cross-sectional view of another tunable filter in a traveling wave configuration, in which the high Q resonator is a microdisc.
Figure 33:
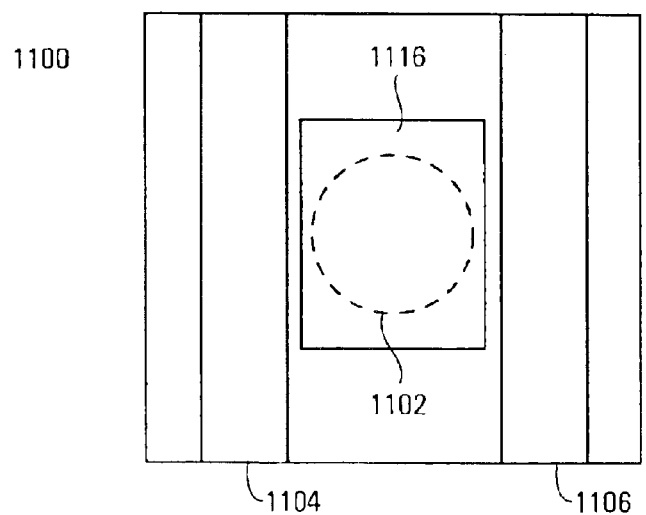
FIG. 33 is a top-view of a portion of the structure of FIG. 32 showing the microdisc in a dashed lined.

FIGS. 32 and 33 show a tunable filter 1100 like that of FIGS. 30 and 31 except the high Q resonator is a microdisc 1102 disposed between first and second waveguides 1104, 1106 formed on a substrate 1108. An actuation mechanism 1110 is shown having a support 1112, a charge plate 1114, a dielectric layer 1116, and supports 1118, which are all preferably like the similar structures illustrated in FIG. 30. In the top view of FIG. 33, the covered microdisc 1101 is shown in dashed lines. The configuration is a traveling wave configuration.

Preferably, the propagation characteristics within the various high Q resonators are altered by controlling actuation based upon a measured feedback signal. That measured signal may be the position of the actuator or the frequency of the output signal from the tunable filter. The latter is useful because output frequency is the typical benchmark of tunable filter operation. For example, a single wide bandwidth laser source may be used to quickly and efficiently provide narrow bandwidth laser energy at a multitude of different peak frequencies using the tunable filters described herein.

Figure 34:
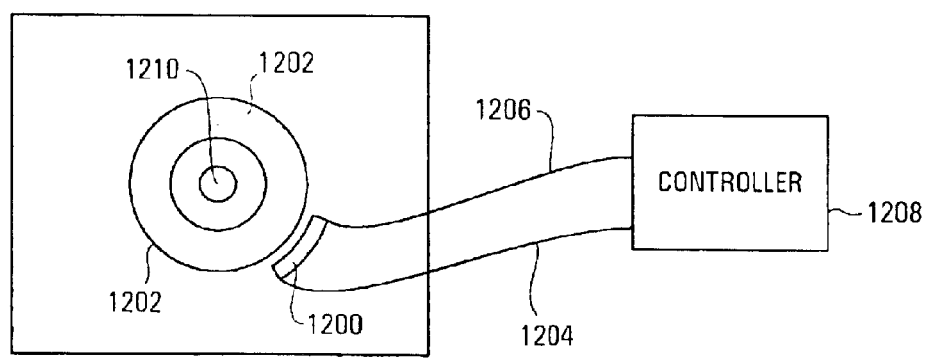
FIG. 34 illustrates a ring resonator disposed near an electrode that is used to measure a measurable parameter at the ring resonator, in accordance with an embodiment.

Index of refraction is temperature dependent, and the resonant frequency of a high Q resonator is likewise temperature dependent. Therefore, it may also be desirable to measure temperature during tuning of the tunable filter. An exemplary temperature measuring set-up is shown in FIG. 34, where an electrode 1200, in the form of a resistive strip, is placed near the top surface of a ring resonator 1202. The resistive strip 1200 is formed of a conductive material, e.g., a metallic material, and dimensioned to allow for the resistance of the strip 1200 to be readily measured. The resistance strip 1200 is positioned such that an operating parameter of the resonator 1202 may be derived—an operating parameter such as the temperature of the resonator 1202. Two electrodes 1204 and 1206 are connected from opposing ends of the resistive strip 1200 to a controller 1208. Measurements may be made, for example, by applying a DC current through the resistive strip 1200. The temperature signal from the resistive strip 1200 and the position of the movable dielectric plate (not shown) are correlated to a measurement of filter frequency. Thus, a curve fitting algorithm may be used by the controller 1208 to adjust the force necessary to obtain the desired resonant frequency based upon the temperature dependent measurement from the strip 1200. It would be understood that one or more normalizing steps may be required to calibrate the resistance and/or temperature calculations. Either way, the controller 1208 may control the actuation mechanism in response to the sensed measurement. The signal from the strip 1200 may be used to adjust the position of the dielectric plate vis-à-vis the ring resonator 1202 or it may be used to update the curve fitting data for resonant frequency versus position of the plate. A position sensor may also be used and one electrode 1210 of such a sensor is shown.

While a resistive measurement is shown in FIG. 34, alternatively, a capacitive measurement may be used to produce a temperature-dependent signal. For example, two electrodes could be used across the ring resonator and an AC signal could be applied across the two electrodes to determine the capacitance therebetween. The capacitive measurement may allow for a more accurate measurement of the temperature across the resonator.

Figure 35:
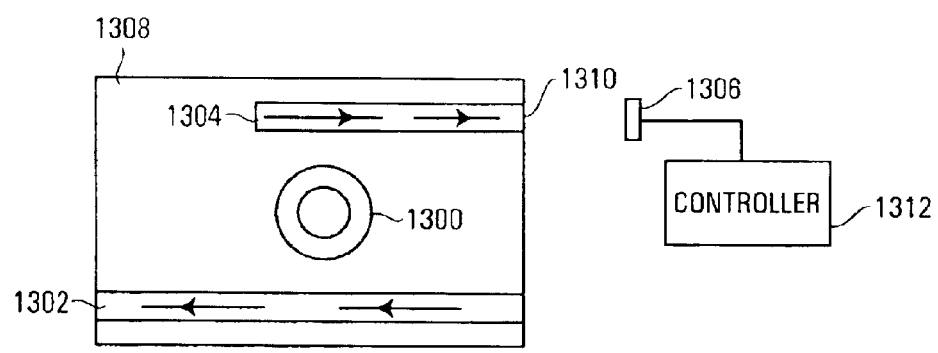
FIG. 35 illustrates a portion of a feedback measurement configuration for a tunable filter, in accordance with an embodiment.

An alternative feedback measurement configuration for a ring resonator 1300 and dual waveguide 1302, 1304 structure is shown in FIG. 35. A frequency detector 1306 is positioned near substrate 1308 at an output port 1310 of the second waveguide 1304. The detector 1306 may include a fixed optical filter in conjunction with a photodetector. The signal at output port 1310 has already been tuned and filtered to the resonant frequency of the high Q resonator 1300, where tuning is controlled by means described herein. The frequency of the signal is detected by 1306 and the information is passed to a controller 1312, where the data is compared to a desired resonant frequency, and the actuation mechanism is correspondingly adjusted to correct for any mismatch between the measured and desired frequency values. It will be understood by persons of ordinary skill in the art that a coupler, isolator, amplifier, and/or other device may be used in implementing this feedback configuration. Further, it will be appreciated that, while the controller 1312 is shown external to the substrate 1308, the controller 1312 may consist of circuitry mounted directly to the substrate 1308 or fabricated therewith.

While various high Q resonators are described in the tunable filter applications of FIGS. 19–35, it will be appreciated that other high Q resonators may be used. Furthermore, numerous actuators are described and illustrated, and any of these may be used in any of the embodiments herein to move a dielectric plate or similar structure within the evanescent coupling region of the high Q resonator to continuously and controllably tune the frequency of the filtered signal produced by the resonator. Furthermore, while the examples are described for use with electromagnetic energies within the visible and infrared wavelengths, they may be alternatively used at other wavelengths, for example, in the microwave region—the L-band, S-band, and C-band in particular. Thus, while resonators are described herein as optical resonators, they are also dielectric resonators that may operate on wavelengths other than those in the visible or near visible range.

Many additional changes and modifications could be made to the disclosed embodiments without departing from the fair scope and spirit thereof. The scope of some changes is discussed above. The scope of others will be come apparent from the appended claims.

What I claim is:

1. For use with a electromagnetic energy source, an optical filter apparatus comprising:
   a dielectric resonator coupled to receive input energy from the source, the dielectric resonator producing an output energy at a resonant frequency of the filter; and
   a dielectric plate mounted adjacent the dielectric resonator and on a support for controllably moving the dielectric plate relative to the dielectric resonator, the dielectric plate and the dielectric resonator defining a variable gap, external to the dielectric resonator, that varies during the controlled movement to alter the resonant frequency of the dielectric resonator.

2. The apparatus of claim 1, further comprising an actuating plate that receives a signal for controllably moving the dielectric plate relative to the dielectric resonator.

3. The apparatus of claim 1, wherein the apparatus further comprises:
   a first waveguide for coupling the input energy into the dielectric resonator; and
   a second waveguide for coupling the output energy from the dielectric resonator.

4. The apparatus of claim 3, wherein the first waveguide couples the input energy into the dielectric resonator to form a standing wave within the dielectric resonator.

5. The apparatus of claim 3, wherein the first waveguide couples the input energy into the dielectric resonator to form a traveling wave within the dielectric resonator.

6. The apparatus of claim 1, wherein the dielectric resonator is a optical resonator.

7. The apparatus of claim 1, wherein the dielectric resonator is a first ring resonator and wherein the dielectric plate includes a second ring resonator.

8. The apparatus of claim 1, further comprising:
a controller coupled to an actuating plate positioned adjacent the dielectric plate for controllably moving the dielectric plate by supplying a signal to the actuating plate; and
at least one electrode disposed at the dielectric resonator for deriving an operating parameter of the dielectric resonator, said controller supplying the signal to the actuating plate in response to the derived operating parameter.

9. The apparatus of claim 8, wherein the operating parameter is the resistance of the electrode or temperature at the dielectric resonator.

10. The apparatus of claim 1, wherein the dielectric plate is controllably moved in response to a measurement of the frequency of the output energy.

11. The apparatus of claim 1, wherein the dielectric resonator includes a cavity defining an internal variable gap that varies in response to changes in a measurable parameter at a sensing surface of the dielectric resonator.

12. The apparatus of claim 11, wherein the cavity is within a propagation core of the dielectric resonator.

13. The apparatus of claim 1, wherein the dielectric resonator is a microdisc.

14. The apparatus of claim 1, wherein the dielectric resonator is a microsphere.

15. The apparatus of claim 1, wherein the dielectric resonator has a Q value above 100.

16. The apparatus of claim 1, wherein the dielectric resonator includes a Bragg filter.

17. For use with a laser source, an optical filter apparatus comprising:
a first waveguide receiving an input energy from the laser source;
a dielectric resonator coupled to receive the input energy and produce an output energy at a resonant frequency of the optical filter, the dielectric resonator having a second waveguide orthogonal to the first waveguide and coupled to the first waveguide over a coupling region;
a dielectric plate mounted adjacent the dielectric resonator; and
an actuator controllably moving the dielectric plate relative to the dielectric resonator, the dielectric plate and the dielectric resonator defining a variable gap, external to the resonator, that varies during the controlled movement to alter the resonant frequency of the dielectric resonator.

18. The apparatus of claim 17, wherein the input energy and the output energy propagate substantially along a first direction and wherein energy within the dielectric resonator propagates substantially along a second direction orthogonal to the first direction.

19. The apparatus of claim 17 further comprising a second waveguide receiving the output energy, the second waveguide being substantially parallel to the first waveguide.

20. The apparatus of claim 17, wherein the dielectric resonator further comprises a first Bragg reflector and a second Bragg reflector.

21. A method of filtering a laser energy, the method comprising:
providing a dielectric resonator having a resonant frequency;
coupling the laser energy into the dielectric resonator;
providing a dielectric plate moveable relative to the dielectric resonator, the dielectric plate and the dielectric resonator defining a variable gap;
controllably varying the variable gap, where variations to the variable gap alter the resonant frequency; and
coupling an output energy from the dielectric resonator, the output energy having a frequency at the resonant frequency.

22. The method of claim 21, wherein providing a dielectric plate further comprises providing an actuator disposed to move the dielectric plate in response to control from a controller.

23. The method of claim 22, wherein providing the actuator further comprises:
providing a actuation plate; and
applying a signal to the actuation plate to controllably deflect or attract the dielectric plate.

24. The method of claim 21, wherein controllably varying the variable gap comprises:
providing an actuator mounted for moving the dielectric plate;
measuring the frequency of the output energy; and
in response to the measured frequency of the output energy, controlling the actuator to move the dielectric plate such that a desired resonant frequency of the dielectric resonator is achieved.

25. The method of claim 24, wherein controlling the actuator comprises;
comparing the measured frequency to the desired resonant frequency;
determining the spacing of the variable gap that will achieve the desired resonant frequency; and
moving the dielectric plate until the desired resonant frequency is achieved.

26. The method of claim 21, further comprising coupling the laser energy into the dielectric resonator to form a standing wave within the dielectric resonator.

27. The method of claim 21, further comprising coupling the laser energy into the dielectric resonator to form a traveling wave within the dielectric resonator.

* * * * *

UNITED STATES PATENT AND TRADEMARK OFFICE
CERTIFICATE OF CORRECTION

| | | |
|---|---|---|
| PATENT NO. | : 7,043,115 B2 | Page 1 of 1 |
| APPLICATION NO. | : 10/323195 | |
| DATED | : May 9, 2006 | |
| INVENTOR(S) | : Roger L. Frick | |

It is certified that error appears in the above-identified patent and that said Letters Patent is hereby corrected as shown below:

On the First Page:

At line (56), Other Publications, line 9, "D1:Report" should be -- D1 Report --.

On the Second Page:

At line (56), Other Publications, $2^{nd}$ Column, line 48, "and" should be -- an --.

In the Specification:

At Column 2, line 19, "an" should be -- a --.

At Column 2, line 22, "though" should be -- those --.

At Column 8, line 54, "Katagirie" should be -- Katagiri --.

At Column 11, line 56, "a" should be -- an --.

In the Claims:

At Column 26, line 29, "a" should be -- an --.

Signed and Sealed this

Thirteenth Day of March, 2007

JON W. DUDAS
*Director of the United States Patent and Trademark Office*